US009571356B2

(12) United States Patent
Christian et al.

(10) Patent No.: US 9,571,356 B2
(45) Date of Patent: Feb. 14, 2017

(54) CAPTURING DATA PACKETS FROM EXTERNAL NETWORKS INTO HIGH AVAILABILITY CLUSTERS WHILE MAINTAINING HIGH AVAILABILITY OF POPULAR DATA PACKETS

(71) Applicant: Zettaset, Inc., Mountain View, CA (US)

(72) Inventors: Brian P. Christian, Santa Cruz, CA (US); Michael W. Dalton, San Francisco, CA (US); Timothy Demarest, San Jose, CA (US); Michael A. Ware, Santa Cruz, CA (US)

(73) Assignee: ZETTASET, INC., Mountain View, CA (US)

( * ) Notice: Subject to any disclaimer, the term of this patent is extended or adjusted under 35 U.S.C. 154(b) by 513 days.

(21) Appl. No.: 14/040,181

(22) Filed: Sep. 27, 2013

(65) Prior Publication Data

US 2015/0092550 A1      Apr. 2, 2015

(51) Int. Cl.
*H04L 12/833*      (2013.01)
*H04L 12/26*      (2006.01)
*G06F 17/30*      (2006.01)
*G06F 9/50*      (2006.01)

(52) U.S. Cl.
CPC .............. *H04L 43/04* (2013.01); *G06F 9/5083* (2013.01); *G06F 17/30079* (2013.01); *H04L 47/31* (2013.01)

(58) Field of Classification Search
CPC ........ H04L 47/31; H04L 43/04; G06F 9/5083; G06F 17/30079
See application file for complete search history.

(56) References Cited

U.S. PATENT DOCUMENTS

| 6,442,601 B1 | 8/2002 | Gampper et al. |
| 7,225,308 B2 | 5/2007 | Melament et al. |
| 7,558,859 B2 | 7/2009 | Kasiolas et al. |

(Continued)

FOREIGN PATENT DOCUMENTS

EP      1556793 B1      2/2013

OTHER PUBLICATIONS

Amur, et al., Robust and Flexible Power-Proportional Storage, Proceedings of the 1st ACM symposium on Cloud computing SoCC 10, 2010, pp. 1-12, ACM Press.

(Continued)

*Primary Examiner* — Robert M Morlan
*Assistant Examiner* — Mandish Randhawa
(74) *Attorney, Agent, or Firm* — Asif Ghias

(57) ABSTRACT

A method and high availability cluster configuration for capture of data packets propagating in an external network into the cluster through a wired-tap connection between the cluster and at least one router of the external network. Captured packets are supplied with popularity tags and striped over high-access-rate non-transitory storage media belonging to a capture pool of serving nodes that are specially provisioned and selected by the master node. The captured packets are either devolved or demoted to low-access-rate non-transitory storage media of at least two serving nodes not including any backup master based on popularity metrics contained their tags. The demotion, devolution as well as determination of popularity metrics and setting of a popularity threshold are managed by a distributed management protocol.

24 Claims, 10 Drawing Sheets

(56) References Cited

U.S. PATENT DOCUMENTS

| | | | |
|---|---|---|---|
| 7,822,921 B2 | 10/2010 | Taylor | |
| 7,921,424 B2 | 4/2011 | Shutt et al. | |
| 7,996,608 B1 | 8/2011 | Chatterjee et al. | |
| 8,006,037 B2 | 8/2011 | Kirshenbaum et al. | |
| 2005/0038890 A1* | 2/2005 | Masuda | H04L 29/06 709/224 |
| 2005/0097287 A1 | 5/2005 | Melament et al. | |
| 2007/0011210 A1 | 1/2007 | Flamma et al. | |
| 2007/0088703 A1 | 4/2007 | Kasiolas et al. | |
| 2008/0301199 A1 | 12/2008 | Bockhold et al. | |
| 2011/0208933 A1 | 8/2011 | Selfin et al. | |
| 2011/0252192 A1 | 10/2011 | Busch et al. | |
| 2012/0182891 A1* | 7/2012 | Lee | H04L 43/04 370/252 |
| 2012/0254364 A1* | 10/2012 | Vijayan | H04L 65/4084 709/219 |
| 2013/0117225 A1 | 5/2013 | Dalton | |
| 2014/0052841 A1* | 2/2014 | Kanemasa | G06F 9/5083 709/224 |

OTHER PUBLICATIONS

Andersen, et al., FAWN: A Fast Array of Wimpy Nodes, 22nd ACM Symposium on Operating Systems Principles, Oct. 11-14, 2009, Big Sky, MT, USA, pp. 1-17.

Caulfield, et al., Moneta: A High-Performance Storage Array Architecture for Next-generation, Non-volatile Memories, 2010 43rd Annual IEEEACM International Symposium on Microarchitecture, pp. 385-395, IEEE.

Chakchai So-In, A Survey of Network Traffic Monitoring and Analysis Tools, IEEE.org, 2006, pp. 1-24, http://www1.cse.wustl.edu/~jain/cse567-06/ftp/net_traffic_monitors3/index.html.

Chen, et al., Hystor: Making the Best Use of Solid State Drives in High Performance Storage Systems, Systems Research, 2011, p. 22-32, ACM Press.

Cisco, Big Data in the Enterprise: Network Design Considerations, Cisco Nexus 5000 Series Switches—White Papers , 2013, pp. 1-24, http://www.cisco.com/c/en/us/products/collateral/switches/nexus-5000-series-switches/white_paper_c11-690561.html.

Cisco, Lawful Intercept Overview, Cisco 7600 Lawful Intercept Confirguration Guide, 2013, pp. 1-5, http://www.cisco.com/c/en/us/td/docs/routers/7600/ios/12-2SR/configuration/lawful_intercept/lawful-int--Book-Wrapper/76L1ch1.html.

Cisco, Turning the router in to Packet Sniffer, Cisco Tips & Tricks, May 2006, pp. 1-29, http://ciscotips.wordpress.com/2006/05/07/turning-the-router-in-to-packet-sniffer/.

GL Communications, GbE Packet Capture, Filter, & Aggregation Tap, PacketShark Brochure,2012, pp. 1-4, Document No. PKV201-01, Galthersburg, MD, USA.

GL Communications, GL Announces PacketShark, GL Communications Website (www.gl.com), Newletter 3, Sep. 2012, pp. 1-2.

Graefe, The five-minute rule twenty years later, and how flash memory changes rules, Proc. 3rd Int'l Workshop on Data Management on New Hardware, Jun. 15, 2007, HP Labs, Palo Alto, CA.

Grigorik, Distributed Coordination with Zookeeper, Distributed Coordination, Apr. 30, 2010, pp. 1-5, http://www.igvita.com/2010/04/30/distributed-coordination-with-zookeeper/.

Invea-Tech, Real Time Network Monitoring, Network Solutions, 2013, https://www.invea.com/en/network-solutions/real-time-network-monitoring.

Koltsidas, et al., The Case for Flash-Aware Multi-Level Caching, 2009, pp. 1-12, School of Informatics, University of Edinburgh, United Kingdom.

Koltsidas, et al., Flashing up the storage layer, Proc VLDB Endow, Aug. 24-30, 2008, Auckland, New Zealand, p. 514-525, vol. 1, Issue: 1, VLDB Endowment.

Kulkarni, Hadoop MapReduce over Lustre, Inside HPC,, Apr. 2013, Intel, http://insidehpc.com/2013/04/23/video-hadoop-mapreduce-over-lustre/.

Lang, et al., Wimpy Node Clusters: What About Non-Wimpy Workloads?, Proc. of the 6th Int'l Workshop on Data Management on New Hardware, Jun. 7, 2010, p. 47-55, vol. 1, ACM.

Lee, et al., An Internet Traffic Analysis Method with MapReduce, IEEE/IFIP, Network Operations and Management Symposium Workshops, 2010, pp. 357-361.

Lee, et al., Toward Scalable Internet Traffic Measurement and Analysis with Hadoop, ACM IGCOMM Computer Communication Review, vol. 43, No. 1, Jan. 2013, pp. 6-13.

Lustre, Running Hadoop with Lustre, Jan. 2010, pp. 1-2, www.wiki.lustre.org/index.php/Running_Hadoop_with_Lustre.

NTOP, Wire Speed Packet Capture, 2013, www.ntop.org/solutions/wire-speed-packet-capture/.

Packer et al., Oracle Database Smart Flash Cache, An Oracle White Paper, Sep. 2010, Oracle Corporation, 500 Oracle Parkway, Redwood Shores, CA 94065, USA.

Payer et al., Combo Drive: Optimizing Cost and Performance in Heterogeneous Storage Device, 1st Workshop on Integrating Solidstate Memory into the Storage Hierarchy, 2009, pp. 1-8, vol. 1, Issue 1.

ReadyBoost, Wikipedia, http://en.wikipedia.org/wiki/ReadyBoost, modification of Feb. 2012, pp. 1-3.

Reinboldt, True Sustained 10 Gb Full Duplex Wire Speed Packet Capture, Product Literature for device such as Gigastor, by Network Instruments, Mar. 2011, pp. 1-2.

Ren et al., I-CASH: Intelligently Coupled Array of SSD and HOD, IEEE, Apr. 11, 2011, pp. 278-289, vol. 02881, Department of Electrical, Computer & Biomed. Eng., U of Rhode Island, USA.

Riverbed, Virtual In-Path Interceptor Appliance Deployment, 2013, Chapter 2 Interceptor Appliance Deployment Design, https://supporistaging.riverbed.com/doc/interceptor/3.0/html/deploy_ica/wwhelp/wwhimpl/common/html/wwhelp.htm#context=deploy_ica&file=design.4.3.html.

Rutman, Map/Reduce on Lustre, Hadoop Performance in HPC Environments, 2011, pp. 1-16, Version 1.4, Xyratex, Fremont, CA, USA.

Saab, Paul, Releasing Flashcache, Facebook, Apr. 27, 2010, from: https://www.facebook.com/note.php?note_id=388112370932, p. 1.

Scott, A Wire-Speed Packet Classification and Capture Module for NetFPGA, First European NetFPGA Developers' Workshop, 2010, Cambridge UK.

Soundararajan et al., Extending SSD Lifetimes with Disk-Based Write Caches, Proc of the 8th USENIX conf. on File and storage technologies, 2010, p. 8-22, vol. 125, Issue 51.

Sun Microsystems, Using Lustre with Apache Hadoop, pp. 1-25.

Tolly, Network Instruments GigaStor 10 Gb Wire Speed, Test Report Commissioned by Network Instruments, LLC, Mar. 2011, pp. 1-6, VerK, Tolly Enterprises, LLC.

Vasudevan et al., Energy-efficient Cluster Computing with FAWN: Workloads and Implications, Proc. of the 1st Int'l Conf. on Energy Efficient Computing and Networking, 2010, p. 1-10, vol. 45, Issue 1, ACM, Carnegie Mellon University, Intel Labs, Pittsburgh, PA, USA.

Vasudevan et al., FAWNdamentally Power-efficient Clusters, Computing, 2009, p. 1-5, vol. 54, Issue: October, ACM Press, Carnegie Mellon University, Intel Labs, Pittsburgh, PA, USA.

Vasudevan et al., FAWNSort: Energy-efficient Sorting of 10GB, Outlook, 2010, pp. 1-4. (http://www.pdLcmu.edu/PDL-FTP/Storage/fawn-joulesort201 O.pdf), Carnegie Mellon University, Intel Labs, Pittsburgh, PA, USA.

Wikipedia, Hybrid Drive, Wikipedia, http://en.wikipedia.org/wiki/Hybrid_drive, modification of Dec. 2011, pp. 1-3.

Wireshark, Getting Tshark up to wire speed for NFS packet captures, Wireshark Q&A, 2012, pp. 1-7, http://ask.wireshark.org/questions/16613/getting-tshark-up-to-wire-speed-for-nfs-packet-captures.

Wood, The Interceptor, DigiNinja, 2013, pp. 1-2, www.digininja.org/interceptor/.

* cited by examiner

CAPTURING DATA PACKETS FROM EXTERNAL NETWORKS INTO HIGH AVAILABILITY CLUSTERS WHILE MAINTAINING HIGH AVAILABILITY OF POPULAR DATA PACKETS

RELATED APPLICATIONS

This application is a Continuation-in-Part of U.S. patent application Ser. No. 13/373,142 by Michael W. Dalton filed on Nov. 3, 2011 and incorporated herein in its entirety.

FIELD OF THE INVENTION

This invention relates generally to the capture of data packets propagating through external networks into high-availability clusters and tagging captured data packets with popularity ratings such that captured data packets that are popular remain highly available, and further ensuring that popular captured data packets are available for jobs that are executed by users or clients of the high-availability cluster, such jobs including batch jobs in particular.

BACKGROUND ART

Most present day computer clusters consist of a large number of individual machines or nodes and various types of resources associated to the nodes. These resources include storage devices of various types. These are usually embodied by non-transitory storage media such as hard disk drives (HDDs) including arrays of such drives (e.g., RAIDs), optical disks, solid state devices (SSDs) and still other types of media known to those skilled in the art.

It is important that clusters maintain a high level of availability of important data files that are stored in the non-transitory storage media belonging to it. In particular, certain data files residing on such clusters need to be kept highly available to users who wish to access these data files and/or execute jobs on these data files.

When nodes belonging to a high availability cluster are tasked with performing a batch job, e.g., a Map-Reduce job, it is crucial to ensure high availability of data files on which the job is to be performed to guarantee rapid execution. This applies in particular to data files that are very popular and hence most likely to be involved in an important batch job. Additionally, preliminary or intermediate results obtained during a Map-Reduce job that are based on the most popular data can be a useful indicator or gauge of the likely final result. Results obtained from processing popular data should thus be made available quickly, whenever practicable. Published Patent Appl. No. 2013/0117225 to Dalton teaches how heterogeneous storage media in high availability clusters can be deployed to ensure high availability of certain popular data files. A high availability cluster as taught by Dalton has nodes provisioned with high-access-rate and low-access-rate non-transitory storage media. A distributed storage medium management protocol determines whether to place data files in the high-access-rate or in the low-access-rate storage media depending on the data file's popularity. High availability of popular data files is ensured by placing or migrating them to high-access-rate storage media, such as solid-state memory or RAM disks. While there, the popular data files are rapidly accessible to users for various purposes, ranging from simple read requests to their deployment in user-defined batch jobs.

In some cases, however, the data files, whether popular or not, are not yet even stored on cluster storage resources. For example, the data of interest has not yet been uploaded to the storage resources of the high availability cluster. This may be the case when the data of interest flows through an external network that is not part of the high availability cluster. In such situations, the data must first be captured from the external network and brought into the high availability cluster.

The prior art teaches many devices for intercepting packets of data propagating through networks. There are two broad types of devices used for accessing or interacting with data flow or traffic on a network. The first group includes traffic flow or monitoring devices. These are sometimes referred to as "packet sniffers" by those skilled in the art. Such devices do not capture the full contents of the data packets. Instead, they monitor the flow of data packets and are thus used in the analysis of network traffic flow. An excellent review of network monitoring with various types of flow tools is provided by Chakchai So-In, "A Survey of Network Traffic Monitoring and Analysis Tools", IEEE.org, 2006, pp. 1-24 at: http://www.cse.wustl.edu/~jain/cse567-06/net_traffic_monitors3.htm.

It should be noted that monitoring of data packet flows is practiced extensively in many areas. This includes Internet traffic analysis using Hadoop Distributed File Systems (HDFS) and batch jobs, such as Map-Reduce deployed in high availability clusters. For more information the reader is referred to Lee Y. et al., "An Internet Traffic Analysis Method with MapReduce", IEEE/IFIP, Network Operations and Management Symposium Workshops, 2010, pp. 357-361.

The actual capture of data packets propagating through an external network, rather than just flow monitoring, requires the second type of device; namely in-path interceptors or packet capture devices. These are typically mounted in routers of the external network and capture entire packets of data propagating through the router. An overview of suitable packet capture devices (also referred to as PCAP devices by some skilled artisans) is provided by Scott M., "A Wire-speed Packet Classification and Capture Module for NetF-PGA", First European NetFPGA Developers' Workshop, 2010, Cambridge, UK. Some specific devices are discussed in practical references as well as product guides and descriptions. These include, among many others, the "GL Announces PacketShark", GL Communications Website (www.gl.com) Newsletter 3 Sep. 2012, pp. 1-2, as well as product literature for devices such as GigaStor™ by Network Instruments (operating at 10 Gb Wire Speed).

Once data packets are captured by a suitable packet capture device from an external network into a cluster, they can be analyzed and operated on. Thus, captured data packets can be submitted for any jobs that are supported by the cluster and its file system. Corresponding teachings are once again provided by Lee Y. et al, "Toward Scalable Internet Traffic Measurement and Analysis with Hadoop", ACM SIGCOMM Computer Communication Review, Vol. 43 No. 1, January 2013, pp. 6-13. This reference addresses the capture of packets into clusters that deploy the Hadoop Distributed File System (HDFS) and are capable of running batch jobs.

Although the above prior art teachings provide solutions to data capture and analysis in a high availability clusters, they do not address several important issues. First of all, the prior art does not teach suitable approaches to ensuring high availability of captured data packets that are popular. In other words, there are at present no suitable methods and/or protocols to ensure that popular data packets captured into the high availability clusters are highly available to cluster users immediately upon capture. Furthermore, the prior art does not address how to manage the packet capture process in cases where the high availability cluster supports different file systems. For example, it would be desirable to capture packets propagating in an external network into a high availability cluster that is configured to run both POSIX-compliant and non-POSIX-compliant (e.g., HDFS) file systems.

OBJECTS AND ADVANTAGES OF THE INVENTION

In view of the shortcomings of the prior art, it is an object of the invention to provide for effective capture of data packets from and external network into a high availability cluster while managing data popularity. This objective is to be accomplished in such a way, that users of the cluster experience high availability of popular data packets from among the captured data packets.

It is another objective of the invention, to provide for the capture of data packets into POSIX-compliant files systems and making them available to operations performed within the context of non-POSIX-compliant file systems such as Hadoop Distributed File System (HDFS).

These and many other objects and advantages of the invention will become apparent from the ensuing description.

SUMMARY OF THE INVENTION

A number of objects and advantages of the invention are achieved by a method for capturing data packets that are propagating in an external network and bringing them into a high availability cluster that has a master node and serving nodes. The method calls for establishing a wired-tap connection between the high availability cluster and at least one of the routers belonging to the external network. The step of capturing is performed through the wired-tap connection and it is actually done by a network packet capturing device for intercepting or capturing data packets at wire speed. The packet capturing device uses the wired-tap connection to gain access to routed data packets as these pass through the router.

The captured data packets fetched by the packet capturing device from among the routed data packets are marked by attaching to each one of them a packet popularity tag. Then, the captured data packets are striped over high-access-rate non-transitory storage media belonging to a capture pool of serving nodes. It is the master node that selects from among the serving nodes those that are to belong to the capture pool. In general, the higher the rate of capture, the more serving nodes need to be selected by the master node to serve in the capture pool in order to keep up with the flow of captured data packets.

Once the captured data packets are saved in the high-access-rate non-transitory storage media of the serving nodes belonging to the capture pool, they can be devolved or passed on to low-access-rate non-transitory storage media. In this step, captured data packets are written from the high-access-rate media to low-access-rate storage media of at least two serving nodes. One of these two serving nodes can be the serving node belonging to the capture pool while the other one could be another serving node belonging to the high availability cluster but not a member of the capture pool. Meanwhile, in accordance with the invention, captured data packets whose packet popularity tag exceeds a certain set threshold are retained in the high-access-rate storage media of the serving node thus guaranteeing their high availability to cluster users.

The method of invention further provides for changing the selection of serving nodes that are in the capture pool based on parameters related to the capture rate. For example, in one embodiment of the method the selection of nodes in the capture pool is dynamically adjusted based on a ratio of captured data packets to routed data packets passing through the router. Specifically, the ratio of captured to routed data packets should be maintained close to or even at 100% to avoid data loss.

In a preferred embodiment of the method of invention, the popularity tag has one or more popularity metrics that are related to the capture time. Preferably, the one or more popularity metrics include a popularity attribute assigned by a search-ranking algorithm, such as, for example, Lucene. The popularity attribute is a time-sensitive metric and it should preferably reflect the popularity of captured data packets immediately prior to or even at the time of their capture. Exemplary popularity metrics can thus include time, interface, source, destination, protocol, port, packet length, time-to-live and version.

In many applications it is advantageous to combine sets of captured data packets into captured files and attach captured file popularity tags to them. The steps of striping, writing and retaining the captured files in high-access-rate media are performed in the same manner as in the case of captured data packets but now based on captured file popularity tags. The captured file popularity tags are constructed in the same manner as packet popularity tags using popularity metrics related to time. Furthermore, original files can be reassembled from the captured data files as part of the method when desired.

The popularity of captured data packets is preferably monitored even after those whose popularity tag was below the set threshold are written to low-access-rate storage media. In particular, when the popularity tag of any captured data packet devolved to low-access-rate storage exceeds the set threshold, then that captured data packet is re-promoted. In other words, captured data packets that gain popularity above the set threshold are migrated from low-access-rate to high-access rate storage. It is also advantageous to periodically re-balance the captured data packets among the low-access-rate and said high-access-rate storage media. Also, it is possible change the threshold thereby initiating the step of migrating now sufficiently popular captured data packets or captured data files to high-access-rate media.

In some embodiments, the captured data packets will be operated on or used in certain types of operations. In those embodiments, the method includes the step of assigning the captured data packets to certain block locations in a POSIX-compliant UNIX file system such as Lustre, which is compatible with capture, writing and migration of large numbers of captured data packets. Meanwhile, the operation of interest is supported by a non-POSIX-compliant Distributed File System such as Hadoop Distributed File System, Btrfs, ZFS or MogileFS.

In view of the above, the method calls for establishing a connection from the non-POSIX-compliant Distributed File System to the POSIX-compliant UNIX file system such that the batch job can be performed on captured data packets within the non-POSIX-compliant Distributed File System. Furthermore, in many embodiments it is convenient to also establish an access window to the captured data packets in the POSIX-compliant UNIX file system. This is particularly helpful for monitoring the performance of a typical batch job being performed on the data. Advantageously, the access window is embodied by a POSIX-compliant interface to the POSIX-compliant UNIX file system and it also includes a second interface to the non-POSIX-compliant Distributed File System.

Many other objects and advantages are achieved by a high availability cluster configured to capture data packets from an external network via at least one router. Once again, the high availability cluster has a master node and serving nodes, each of which has high-access-rate and low-access-rate storage media. The network packet capturing device that establishes the wire-tap connection to one or more routers of the external network is preferably a wire speed network packet capturing device. In other words, it is capable of capturing data traffic at rates on the order of 10 Gb/s or higher, where the wire rate of the given network is 10 Gb/s. Multiple interfaces can be aggregated to achieve speeds higher than 10 Gb/s, or newer protocols and equipment such as 40 Gbe or 100 Gbe can be supported.

The high availability cluster deploys a distributed management protocol for attaching the popularity tags to captured data packets. In other words, the distributed management protocol preferably resides on the master node as well as all serving nodes, and especially on serving nodes selected by the master into the capture pool. The distributed management protocol is preferably also in charge of determining which captured data packets have popularity tags that exceed the set threshold and are thus to be retained in the high-access-rate storage media. Similarly, the distributed management protocol is also in charge of re-promoting devolved data packets when their popularity exceeds the threshold.

As indicated above, when the selection of serving nodes to whose low-access-rate storage media lower popularity captured data packets are devolved is made, it is preferable that at least one of them not be a member of the capture pool. Of course, the distributed management protocol can also be deployed to assist in making the corresponding selection.

The high availability cluster should be configured to perform batch jobs, such as Map-Reduce operations on captured data packets that are captured and stored into a POSIX-compliant UNIX file system. Since the batch jobs are run form a non-POSIX-compliant Distributed File System, corresponding connections between the file systems are provided. Access windows and other interfaces are suitable for making such connections.

The present invention, including the preferred embodiment, will now be described in detail in the below detailed description with reference to the attached drawing figures.

BRIEF DESCRIPTION OF THE DRAWING FIGURES

DETAILED DESCRIPTION

The following description relates to preferred embodiments of the present invention by way of illustration only. Likewise, the figures depict embodiments of the present invention for purposes of illustration only. One skilled in the art will readily recognize from the description and figures that alternative embodiments of the methods and systems illustrated herein may be employed without departing from the principles of the invention described herein.

Figure 1:
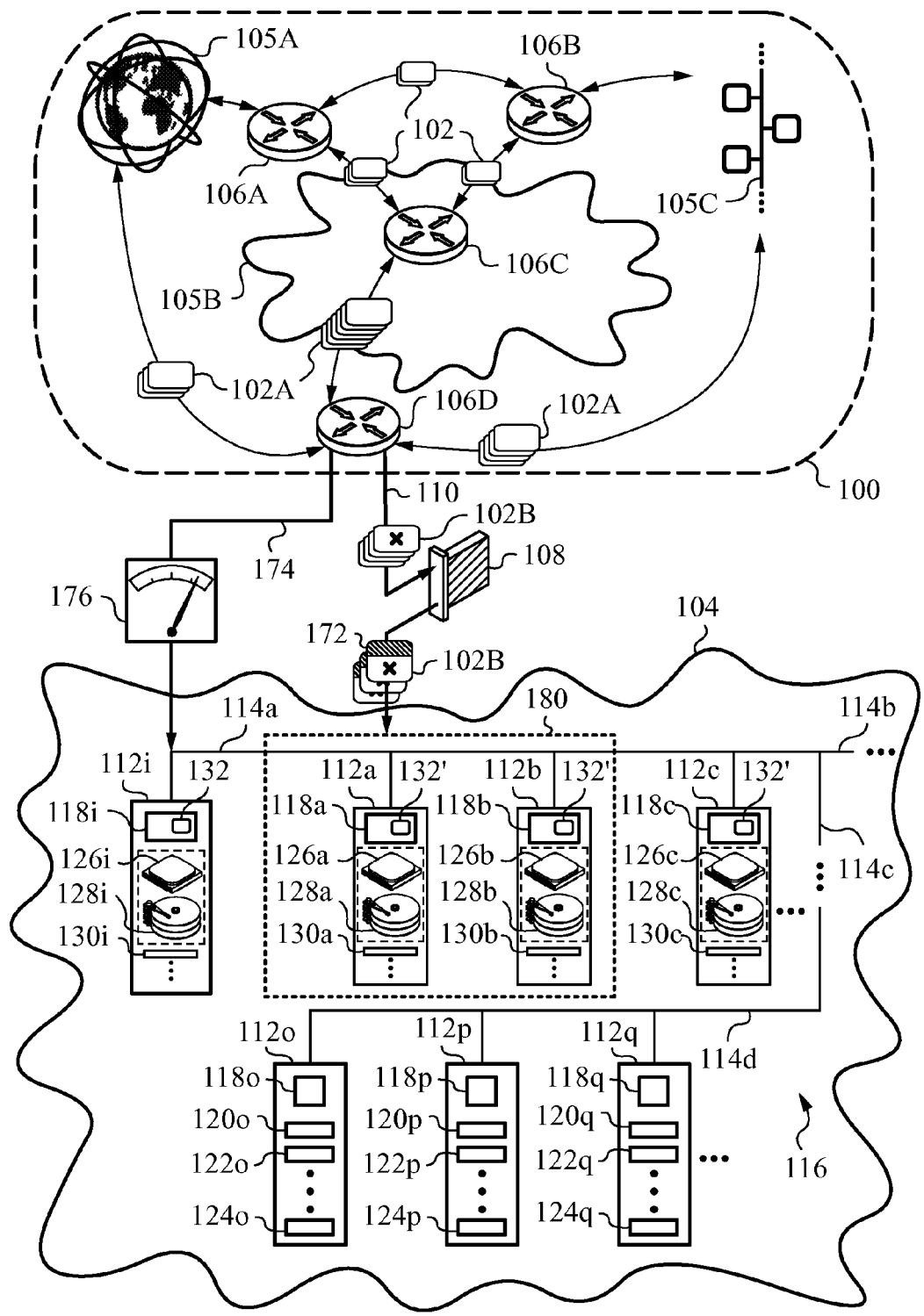
FIG. 1 is a high-level diagram showing a high availability cluster and an external network from which the high availability cluster captures data packets in accordance with the invention.

The present invention will be best understood by initially referring to the high-level diagram of FIG. 1. This drawing illustrates a high availability cluster 104 configured to capture data packets 102 propagating through a network 100 that is external to cluster 104. External network 100 can be a single network, or it may consist of many types of independent networks, local networks, private networks, wide area networks, global networks, sub-networks and/or still other types of partial, subordinate and independent networks. In the present embodiment, for example, network 100 is constituted by a combination of an international global network 105A, the World-Wide-Web 105B and a core network 105C.

The three networks or parts 105A, 105B, 105C of external network 100 are interconnected by a number of routers 106. Of these, only four routers are expressly shown and labeled by reference numerals 106A, 106B, 106C and 106D in the high-level diagram of FIG. 1. Routers 106A, 106B, 106D direct the traffic of data packets between parts 105A, 105B, 105C of external network 100 while router 106C directs data traffic within World-Wide-Web 105B. Of course, a person skilled in the art will recognize that various topological arrangements and connections between (inter) and within (intra) international global network 105A, World-Wide-Web 105B and core network 105C are present. Thus, any number of routers 106 operating both between and within parts 105A, 105B, 105C of external network 100 are deployed at any point in time to support data traffic.

According to the invention, high availability cluster 104 is configured to capture data packets 102 from external network 100 by tapping into the traffic propagating through one or more routers 106. The capture is performed with the aid of a network packet capturing device 108, also frequently called a packet interceptor, a flow exporter or a packet capture tool by those skilled in the art. Capturing device 108 is preferably a wire-speed network packet capturing device. In other words, capturing device 108 can capture data packets at the transfer rates or wire rates supported by network 100. There are many suitable packet capture tools. They include the TShark produced by Wireshark, GL's PacketShark produced by GL Communications Inc., FlowMon made by INVEA-TECH and specifically designed for real-time network monitoring, GigaStor developed by Network Instruments, nPulse CPX supplied by NPulse Technologies, Inc. and many others.

In any specific application, the capture rate will be selected or set based on expected or measured data traffic rates (wire speeds) in external network 100 and/or any of its constituent parts 105A, 105B, 105C. More precisely, the rate should be based on the speed of traffic routed by the one or more routers 106 that are enlisted for data capture. In many present-day systems, capturing data traffic at rates of between about 10 Gb/s and 20 Gb/s will be sufficient, since this is the wire speed of most typical networks.

In the present embodiment, wire-speed capturing device 108 is connected by a wire-tap connection 110 to router 106D. Thus, all data traffic passing through router 106D can be intercepted and captured by capturing device 108. For clarity of explanation, data packets routed by router 106D are referred to as routed data packets and they are designated by reference 102A to distinguish them as a subset of all data packets 102 that propagate through network 100.

High availability cluster 104 has a number of nodes 112a, 112b, 112c, . . . , 112i, . . . , 112o, 112p, 112q, of which only some are explicitly shown in FIG. 1 for reasons of clarity. Typically, nodes 112a through 112q of cluster 104 are geographically collocated, and may even be housed in the same building. Further, nodes 112a through 112q are interconnected by lines 114a-d of a local area network 116, or LAN. Thus, nodes 112a through 112q can communicate among each other "privately" via LAN 116.

Each node 112a through 112q has a corresponding processor, server, computer or other device with processing capabilities generally referred to herein as machine 118a through 118q. Each node 112a-q also has associated with it a set of resources. The resource allocation differs across nodes 112a through 112q of cluster 104.

Specifically, a number of nodes 112o-q have resources 120o-q, 122o-q and 124o-q. Additional resources beyond those expressly called out can be present at these nodes, as indicated by the ellipsis. Exemplary resources 120o-q, 122o-q, 124o-q include printers, monitors, application-specific processors, block storage devices including hard drive devices (e.g., parallel or serial, such as SATA), flash drives and any other cluster resources. In fact, any physical or logical component that can be brought on-line and off-line, managed in cluster 104 and hosted by just one of nodes 112o-q at a time can be represented among the set of resources 120o-q, 122o-q and 124o-q. It should be also noted that nodes 112o-q can each be provisioned with the same or different resources. A person skilled in the art will recognize that any workable allocation of resources and node topology is permissible.

In contrast, nodes 112a-c and node 112i are selected from among nodes 112a-q of cluster 104 in accordance with the requirements of the present invention. More precisely, nodes 112a-c, 112i are members of a set of a number k of nodes chosen from among all nodes 112a-q of cluster 104 and provisioned in a particular way. The number k has to be at least two, i.e., k≥2, although it should typically be much larger, and it has no prescribed upper bound. Note that many additional nodes besides nodes 112a-c and node 112i (e.g., node 112g not shown in FIG. 1) may be selected to belong to the set of k nodes. For clarity of explanation and visualization, these nodes are not explicitly called out in the present figure and are instead indicated by the ellipsis.

In some embodiments, all nodes 112a-q of cluster 104 belong to the set of k nodes and are thus specially provisioned. In other words, the number k is not restricted and can be on the order of 100s in large clusters or even on the order of 1,000s. In the exemplary embodiment shown in FIG. 1, the number k is kept small for clarity of explanation—in particular, k=4.

One of the k specially provisioned nodes 112a-c, 112i is the master of cluster 104. In the present embodiment, node 112i is the master or leader of cluster 104. The other k-1 nodes 112a-c, preferably include a back-up master and regular nodes or serving nodes that are not master candidates. As a rule, the number k should preferably be much larger than the set of all master candidates (including the present master).

The special provisioning of k nodes 112a-c, 112i involves their storage resources or storage media. In general, storage resources include different types of non-transitory storage media known to those skilled in the art. More precisely, they are heterogeneous, non-transitory storage resources that are recognized as block storage devices by any distributed computer system. Suitable heterogeneous, non-transitory storage resources can include two or more of any suitable members of a large group of candidates. For example, they can include any mass storage device(s) interfaced via Serial ATA (SATA), Hard Disk Drives (HDD), Redundant Arrays of Independent Disks (RAID), Solid State Drives (SSD), optical drives, the Cloud, tape and other general block storage devices.

The storage resources of the set of k specially provisioned nodes 112a-c, 112i (recall that k=4 in present example) are heterogeneous and they differ fundamentally in access-time or access-rate performance. In other words, storage resources 126a-c, 126i and storage resources 128a-c, 128i are heterogeneous. They are shown within dashed boxes in FIG. 1 for clarity. Meanwhile, the remaining resources of nodes 112a-c, 112i generally indicated by 130a-c, 130i and by the ellipsis can be the same as those found at regular nodes 112o-q.

Storage resources 126a-c, 126i are high-access-rate non-transitory storage media, such as flash storage drives. Meanwhile, storage resources 128a-c, 128i are low-access-rate non-transitory storage media, such as hard disk drives (e.g., SATA) or any other storage media that can be maintained on-line in cluster 104. In general, due to differences in performance, the cost of high-access-rate storage media 126a-c, 126i is much greater than the cost of low-access-rate storage media 128a-c, 128i.

It is well known that actual access-rates for any particular storage medium is more fully categorized by metrics such as read-time, write-time, Input/Output (I/O) throughput, random seek time and the like. The values of these metrics are not specifically limited to certain numbers or numerical ranges. Rather, it is the relative difference between these two types of storage media that is important in the present invention.

Thus, in a preferred embodiment of the invention, the relative difference in access-rate between high-access-rate storage media 126a-c, 126i and low-access-rate storage media 128a-c, 128i should be at least a factor of 3 and more preferably a factor of 10 or higher. This access-rate performance gap can be measured in terms of a collection of the metrics mentioned above, e.g., a simple or weighted average. It can also be based on an average worst-case scenario. Alternatively, just one of the metrics can be chosen to quantify the access-rate performance gap, such as the I/O throughput. It is important to note, however, that without a factor of at least 3 in the access-rate performance gap the advantages of the present invention will be very difficult to realize.

In accordance with the invention, cluster 104 has a distributed management protocol 132 for supervising the capture of routed data packets 102A and for directing the related operations of high-access-rate storage media 126a-c, 126i and low-access-rate storage media 128a-c, 128i. The overall management portion of protocol 132 is running on machine 118i of master 112i. The subordinate portions of protocol 132 are designated by reference 132' and they are running on machines 118a-c of nodes 112a-c.

Distributed management protocol 132 also supervises the operation of capturing device 108. In fact, protocol 132 is responsible for directing the attachment of popularity tags 172 to each captured data packet 102B from router 106D. Note that captured data packets 102B are necessarily a subset of routed data packets 102A. That is because routed data packets 102A are the only data packets among all data packets 102 propagating in network 100 that can be captured through wired-tap connection 110 established from capturing device 108 to router 106D.

In addition to wired-tap connection 110, cluster 104 also maintains a monitoring connection 174 to router 106D. Monitoring connection 174 is used to obtain reports and status information from router 106D. One particularly important piece of information received from router 106D via connection 174 is its total data traffic, i.e., the total number of routed data packets 102A being routed by it per unit time. To assist in this function, it is preferable that NetFlow monitoring be enabled on router 106D.

NewFlow is a standard network protocol developed by Cisco Systems for gathering IP traffic information. This includes statistics on the performance of any router, including information about routed packets, IP addresses, frame rates, etc. Alternatively, it is also possible to enable the newly emerging universal standard of export for Internet Protocol flow information from routers called Internet Protocol Flow Information Export (IPFIX). Of course, there are many other options and standards for obtaining the requisite information from router 106D. These include: Jflow or cflowd (Juniper Networks), NetStream (3Com/Hewlett-Packard), Rflow (Ericsson), AppFlow (Citrix) and sFlow. There are many vendors that supply the requisite tools to implement monitoring of router 106D via connection 174 in accordance with any of the above protocols and/or standards and/or still other suitable protocols.

In the present embodiment, a capture ratio monitor 176 is provided to specifically indicate the capture performance that is based on the number of routed data packets 102A and captured data packets 102B. The proportion of routed to captured data packets is obtained with any suitable monitoring approach selected from the ones listed above. Capture performance can be expressed in any suitable manner. For example, it is expressed by a simple fraction or ratio of captured data packets 102B to routed data packets 102A. Of course, to compute the ratio representing capture performance in real time, monitor 176 has to know the instantaneous number of captured data packets 102 from capturing device 108. The corresponding physical connection is not shown in FIG. 1, but a person skilled in the art will appreciate that a patch cable connection or equivalent will suffice for these purposes.

Alternatively, it is also possible to compute, derive or even obtain the pre-computed capture performance directly from the flow monitoring protocol or standard. In fact, many of these protocols/standards intrinsically perform the requisite computation. In such embodiments there is no need for dedicated monitor 176. In still other embodiments, the capture ratio is computed on master node 112i by distributed management protocol 132. This approach should be taken in the absence of monitor 176 and when the flow monitoring standard or protocol deployed does not pre-compute capture performance.

During operation, network 100 supports regular traffic or propagation of data packets 102. A subset of data packets 102, namely routed data packets 102A pass through router 106D. As noted above, the wired-tap connection 110 enables capturing device 108 operating at wire-speed to fetch from among routed data packets 102A a certain number of captured data packets 102B. Capture performance dictates the ratio of captured to routed data packets. In accordance with the invention, the ratio of captured to routed data packets should be maintained at 100% or as close to it as practicable in order to prevent data loss.

Figure 2A:
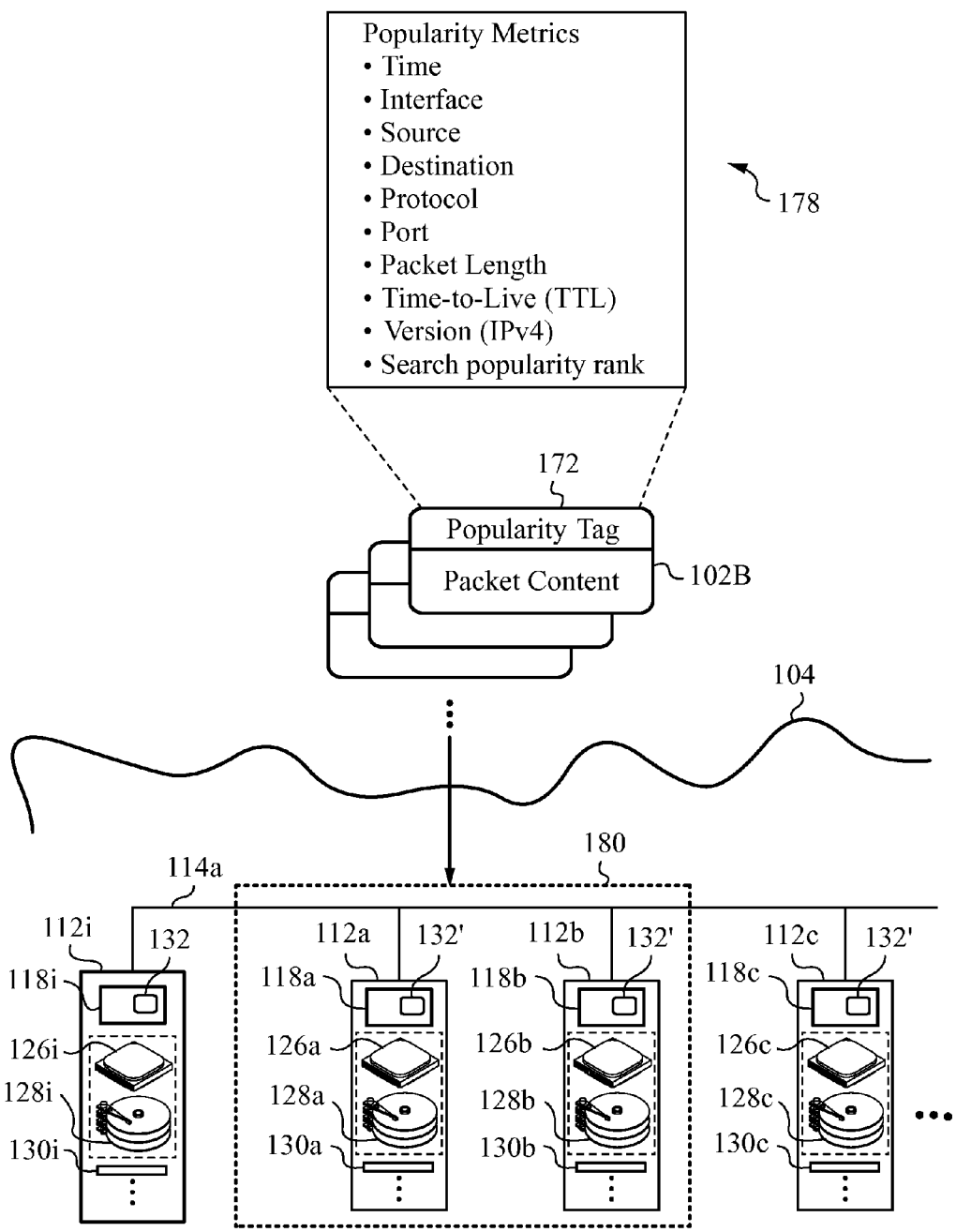
FIG. 2A is a diagram illustrating a captured data packet marked with a packet popularity tag and brought into the high availability cluster shown in FIG. 1.

As shown in more detail in FIG. 2A, each captured data packet 102B is marked with its corresponding popularity tag 172 and is then brought into high availability cluster 104. Preferably, popularity tag 172 contains one or more packet popularity metrics 178 that are related to and include packet capture time. In fact, capture time—also sometimes referred to as "data freshness" by those skilled in the art—is frequently the most important of all packet popularity metrics 178 in tag 172 and it is typically supplied directly by capturing device 108 without special modifications.

In accordance with the invention, additional popularity attributes related to how often the content of captured data packet 102B is requested or searched by users of network 100 can serve as additional packet popularity metrics 178. Still other packet popularity metrics 178 can include a prior popularity, a subject related popularity and/or a current popularity. A person skilled in the art will recognize that there are many methods for establishing popularity and that various combinations of packet popularity metrics 178 can be used to derive a composite value. Such composite value can be used instead of individual popularity metrics 178 in popularity tag 172.

Preferably, the one or more packet popularity metrics 178 include a popularity attribute assigned by a search-ranking algorithm, such as Lucene. More preferably still, popularity attribute deployed should be time-sensitive and it should preferably reflect the popularity of captured data packet 102B immediately prior to or even at the time of capture.

Of course, once a set of packet popularity metrics 178 is chosen for popularity tag 172 it should be kept consistent across all captured data packets 102B in order to allow for comparison and popularity ranking. More specifically, the choice and implementation of packet popularity metrics 178 should permit an unambiguous derivation of a popularity value from each popularity tag 172 for purposes of comparison to a set threshold. A non-exhaustive list of exemplary packet popularity metrics 178 that include time, interface, source, destination, protocol, port, packet length, time-to-live, version and search popularity rank (e.g., as assigned by the Lucene protocol) are shown in FIG. 2A.

Figure 2B:
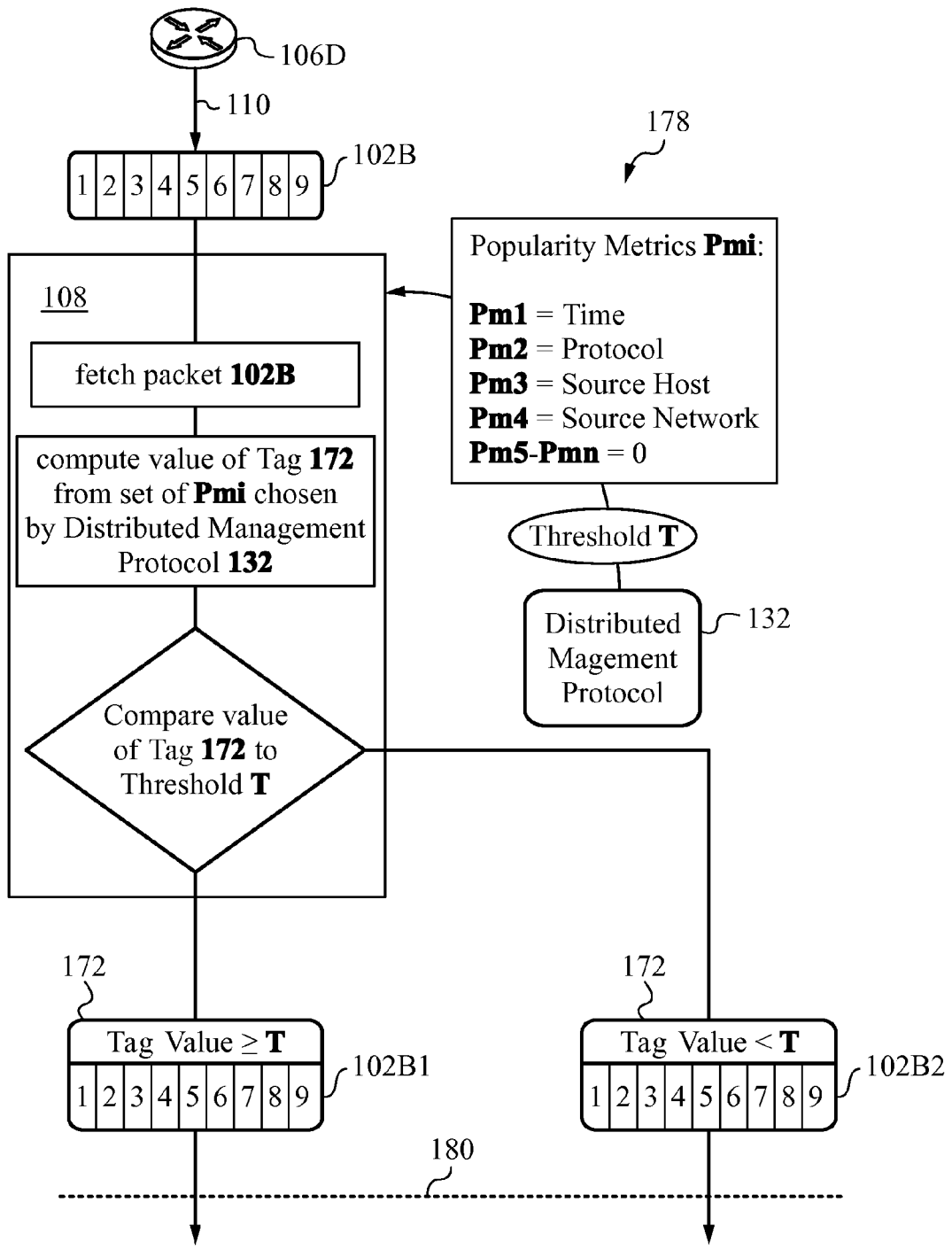
FIG. 2B is a diagram showing the details of tagging of captured data packets and determining the value of the packet popularity tag with respect to a set threshold.

The specific steps of tagging and deriving popularity values based on select packet popularity metrics 178 are shown in FIG. 2B. More precisely, the diagram of FIG. 2B elucidates the mechanics of attaching packet popularity tags 172 to captured data packets 102B and determining the values of tags 172 with respect to a set threshold T. In the example shown, a select number of popularity metrics 178 that are indexed by $Pm_i$ are being used. In this example, Pm stands for popularity metric and the index i enumerates the specific metric 178 chosen. Also, each captured data packet 102B is shown in more detail in FIG. 2B by identifying its structure with nine segments numbered consecutively.

In the preferred embodiment, distributed management protocol 132 running on machine 118*i* of master node 112*i* (see FIG. 1) maintains a list of selected packet popularity metrics 178 indexed by $Pm_i$. Furthermore, protocol 132 also maintains the set value of threshold T. Of course, system designer or one of its users can change the selection of packet popularity metrics 178 or the value of threshold T, or both, depending on application.

In the present example, there are four packet popularity metrics $Pm_1$, $Pm_2$, $Pm_3$ and $Pm_4$ that have been selected and whose list is being maintained by distributed management protocol 132. All other possible popularity metrics $Pm_5$ through $Pm_n$ are not being used in the present example and are thus conveniently set equal to zero. First packet popularity metric $Pm_1$ is capture time (a.k.a. "data freshness") and second popularity matric $Pm_2$ is its protocol. Third popularity metric $Pm_3$ is the source host of the data packet, and the fourth metric $Pm_4$ is the source network, which is the part of external network 100 (i.e., 105A, 105B or 105C in the present case—see FIG. 1) from which captured packet 102B originated.

During operation and as indicated in FIG. 2B, distributed management protocol 132 provides current value of threshold T as well as the values of popularity metrics $Pm_i$ on its list to capturing device 108. Thus, as device 108 fetches each captured data packet 102B via wire-tap connection 110 from router 106D, it has the requisite information to create and attach correct tag 172 to each captured packet 102B.

We now review a very specific example of how capturing device 108 attaches tags 172 and computes their values based on packet popularity metrics 178 indicated by distributed management protocol 132. In this example, threshold T has been set at the numeric value of 50 (T=50). In addition, most metrics 178 selected for use by protocol 132 in this example are already contained in captured data packets 102B. The only notable exception is capture time, which is added or stamped by device 108 at the time of capture.

First packet popularity metric $Pm_1$ corresponding to capture time is assigned a value based on Greenwich Mean Time (GMT). Specifically, for all captured data packets 102B given a time stamp after 00:00 GMT but before 05:00 GMT metric $Pm_1$ is assigned the value of 15 ($Pm_1$=15). For all captured data packets 102B time stamped after 05:00 GMT but before 00:00 GMT metric $Pm_1$ is assigned the value of 0 ($Pm_1$=0). The instructions on these specific value assignments are contained in the most current list of metrics 178 sent to capturing device 108 by protocol 132.

Second packet popularity metric $Pm_2$ has two possible protocols of interest, namely HTTP and HTTPS. For all captured data packets 102B conformant to either HTTP or HTTPS protocol capturing device 108 is instructed by distributed protocol 132 to assign a value of 30 ($Pm_2$=30). All other protocols are assigned a value of 0. Once again, the instructions on these specific value assignments are contained in the most current list of metrics 178 sent to capturing device 108 by protocol 132.

Third packet popularity metric $Pm_3$ reflects only one source host of interest, namely 172.16.0.20/32. Captured data packets 102B originating from this host are assigned the value of 50 ($Pm_3$=50) while others are set to zero. Finally, fourth packet popularity metric $Pm_4$ reflects only one source network of interest, namely 172.16.0.0/16. Captured data packets 102B originating from this host network are assigned the value of 25 ($Pm_4$=25) while others are set to zero. As indicated above, all remaining potential popularity metrics are set to zero in this example ($Pm_i$=0 for all i=5 to n).

The numerical value of tag 172 is computed by summing all packet popularity metrics $Pm_i$. In other words, tag value is:

$$\text{tag value} = \sum_{i=1}^{n} Pm_i \qquad \text{Eq. 1}$$

where the sum runs over all possible values of index i. Thus, for example, captured data packet 102B1 with capture time stamp at 1:17 GMT, using HTTP protocol and originating from source host 172.16.0.20/32 would have a tag value of 95 based on popularity metrics $Pm_1$, $Pm_2$ and $Pm_3$ alone. If captured data packet 102B1 also originated from source network 172.16.0.0/16 then the value of its tag 172 would be 120, since $Pm_4$ would then be equal to 25. Meanwhile, captured data packet 102B2 captured at 18:46 GMT, using the SSH protocol, originating from source network 192.168.10.0/24 will have a value of its tag 172 equal to 0.

By deploying Eq. 1 and value assignment instructions from protocol 132, the Capture device 108 is thus able to construct tags 172 for all captured packets 102B and computes their numerical values. Once the values of tags 172 are known, device 108 runs a comparison of each tag value with set threshold T (which was also provided by protocol 132). This comparison is made because the routing of corresponding captured packet 102B to capture pool 180 is determined by whether tag value is larger than or equal to threshold T, or else smaller than threshold T.

Figure 3:
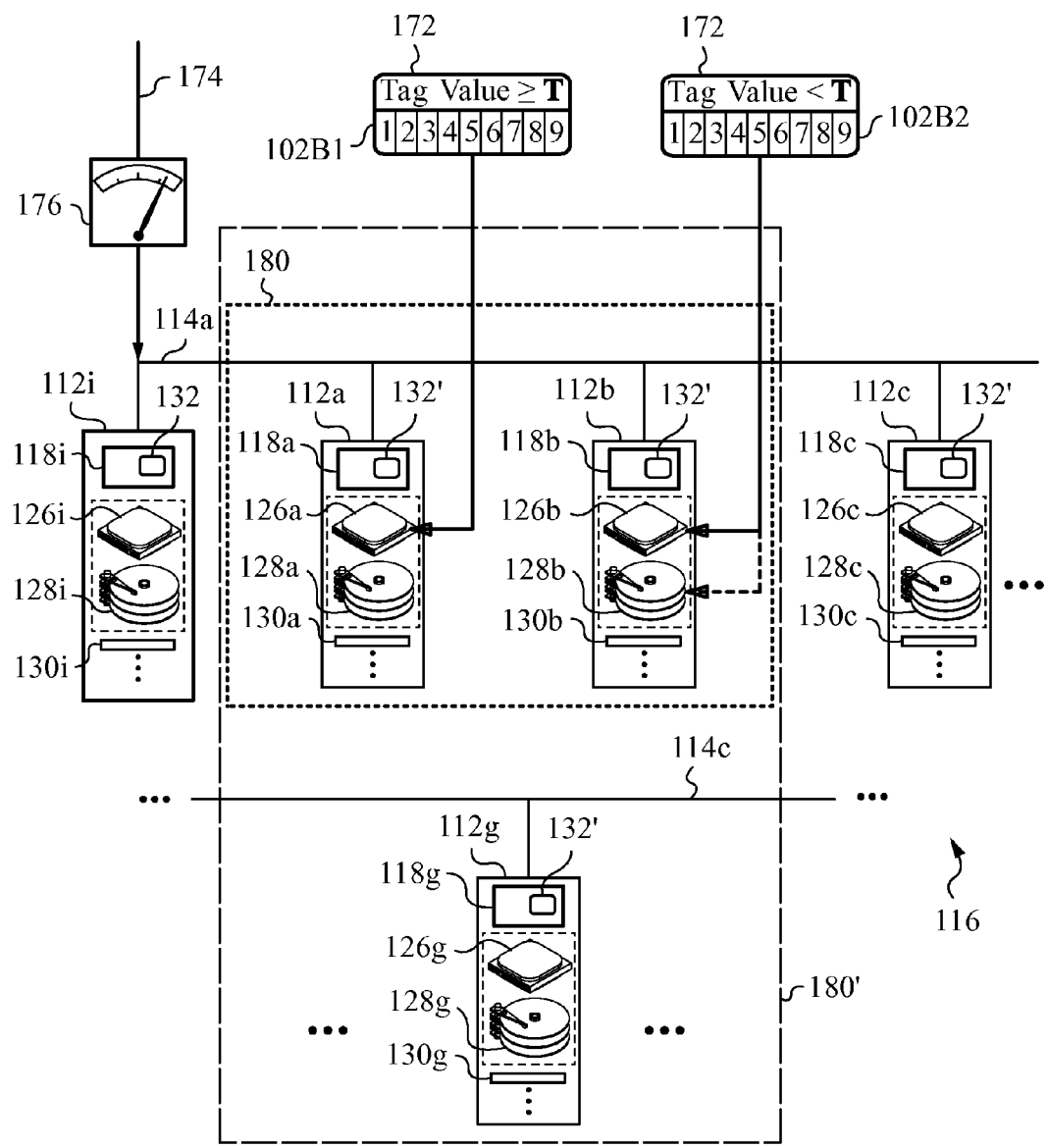
FIG. 3 is a diagram illustrating the striping of captured data packets over the capture pool of serving nodes and the expansion of the capture pool in the high availability cluster of FIG. 1.

Turning now to FIG. 3, we note that packet 102B1 whose tag 172 has a value of 95 and is thus larger than threshold T (T=50) is sent to capture pool 180 to be stored and kept in high-access-rate media 126*a* of serving node 112*a*. That is because packet 102B1 is popular and has to remain highly available given that its tag 172 has a value that exceeds threshold T.

Meanwhile, packet 102B2 has a tag 172 whose numerical value is 0. This is clearly less than threshold T. Thus, packet 102B2 is not popular. Now, unpopular packet 102B2 is also sent to capture pool 180 to be stored in high-access-rate media 126*b* of serving node 112*b*, but with instructions to local distributed management protocol 132' to demote packet 102B2 to low-access-rate media 128*b* as soon as practicable. That is because packet 102B2 does not have to remain highly available given its tag value is 0.

Note that due to the high volume or throughput of captured data packets 102B obtained at wire speeds, all of them, whether popular or not, are initially written to high-access-rate media. That is done to guarantee that no captured packets 102B are dropped and to avoid bottlenecks by attempting to write to low-access-rate media with freshly captured data packets 102B. Thus, the step of demoting low popularity captured packets 102B, such as data packet 102B2 in our example, always takes place after the initial write is to high-access-rate medium.

Indeed, it is important that the size of capture pool 180 be actively managed by distributed management protocol 132, 132' in such a way, that bottlenecks in the process of ingesting and striping captured data packets 102B be avoided at all times. To ensure this, protocol 132, 132' monitors the performance of high-access-rate media 126*a*, 126*b* belonging to a capture pool 180 of serving nodes. In the present embodiment, just two serving nodes 112*a* and 112*b* belong to capture pool 180, while serving node 112*c* does not. Thus, captured data packets 102B with popularity tags 172, including packets 102B1 and 102B2 in particular, are transferred directly from capturing device 108 to high-access-rate media 126*a*, 126*b* of serving nodes 112*a*, 112*b* as shown by the arrows. Notice that two serving nodes represent the smallest size of capture pool 180 envisioned by the present invention.

Since master node 112*i* is responsible for operating cluster 104 while in charge, it is master node 112*i* that selects nodes to capture pool 180 and updates the pool's membership dynamically during operation via protocol 132 running on its machine 118*i*. Of course, all members of pool 180 communicate their status to master node 112*i* via their subordinate portions of protocol 132' running locally on their own machines to enable selection of appropriate nodes into capture pool 180.

Qualifying candidates for inclusion in capture pool 180 are in the set of the k-1 specially provisioned nodes 112*a-c*. This is the group of k nodes excluding master node 112*i* itself, since, while fulfilling its master duties, the latter is not available to be a serving node. Differently put, the k-1 nodes in this case are the three serving nodes 112*a-c* that are specially provisioned with high-access-rate and low-access-rate storage resources, as described above. It should be remarked, that in some embodiments of the present invention master node 112*i* does not need to be specially provisioned with high-access-rate and low-access-rate storage media. Such provisioning, however, is always required of serving nodes that are eligible for election into capture pool 180.

In many cases, the set of k-1 nodes 112*a-c* will include a back-up master. For instance, in the present embodiment node 112*c* is a back-up master scheduled to take over the duties of master node 112*i* in the event of master failure and consequent failover. Alternatively, several back-up masters can be available and subject to election by quorum vote in accordance with well-known principles of handling failover events in high availability clusters.

In any case, since serving node 112*c* is a back-up master candidate, it is also not available for selection into capture pool 180. Indeed, whenever a back-up master is in the set of k nodes, only the set of k-2 nodes is available for capture pool 180. In other words, only the two regular nodes or serving nodes 112*a*, 112*b* that are not the present master or the back-up master are available for capture pool 180. It is now clear why only the minimum set of k-2 (i.e., just two) serving nodes 112*a*, 112*b* are in capture pool 180 as shown in FIG. 1.

In practice, striping of captured data packets 102B over high-access-rate non-transitory storage media 126*a*, 126*b* of just two serving nodes 112*a*, 112*b* selected by master 112*i* into capture pool 180 can be limiting. In particular, when capturing the usually large numbers of routed data packets 102A passing through router 106D, there exists a potential for packet loss due to instantaneous unavailability of nodes 112*a*, 112*b* in pool 180 to receive all captured data packets 102B. In other words, one or both nodes 112*a*, 112*b* in capture pool 180 can be unavailable to execute and may thus miss data writes.

When capturing at high rates encountered at wire speed, misses in writes can quickly escalate to produce bottlenecks and result in loss of some captured data packets 102B. This problem is exacerbated when nodes 112*a*, 112*b* belonging to capture pool 180 are also contemporaneously serving data to clients (users) of high availability cluster 104. Thus, it is important to avoid situations in which any node that is a member of capture pool 180 experiences utilization of even close to 100%. Such high utilization effectively eliminates the correspondent node (either 112*a* or 112*b*—or even both of them) from doing anything but receiving captured data packets 102B being striped across high-access-rate storage media 126*a*, 126*b*.

For this reasons, it is advantageous for distributed management protocol 132, 132' to deploy a technique of dynamic adjustment of the number of nodes in pool 180. According to such throttling of capture pool nodes, additional nodes are added to pool 180 when subordinate distributed protocol portion 132' running on any node in capture pool 180 registers more than, 75% or 80% utilization. Thus, in order not to produce a bottleneck during the striping process in the present example, more than just two specially provisioned serving nodes 112*a*, 112*b* should be available to join capture pool 180 and receive packets 102B being captured at wire speed. The higher the rate of capture, the more serving nodes need to be selected by master node 112*i* to serve in capture pool 180 in order to keep up with the flow of captured data packets 102B. Still differently put, to provide a safety margin, the number k of specially provisioned nodes in cluster 104 should preferably be much larger than the set of all master candidates including the present master.

FIG. 3 illustrates a time when master 112*i* has in fact increased the size of capture pool 180 to an expanded capture pool 180', as indicated by the box drawn in long-dashed line. The expansion supports data capture at wire speed and prevents any serving node in pool 180 from experiencing excessive utilization (e.g., above 75%). Expanded capture pool 180' shown in FIG. 3 includes many additional specially provisioned serving nodes indicated by the ellipsis. Expanded capture pool 180' also includes the expressly designated serving node 112*g*. Serving node 112*g* has high-access-rate and low-access-rate storage media 126*g*, 128*g* and is connected on line 114*c* of LAN 116 for intra-cluster communications.

In addition to the level of node utilization, the step of changing the selection of nodes in capture pool 180 is overseen by master 112*i* based on one or more parameters related to the capture rate or performance. The actual performance based and dynamic selection of capture pool 180 is also implemented by distributed management protocol 132. This is convenient, since we recall that distributed protocol 132 is already running on master node 112*i* and its subordinate portions 132' are running and monitoring the performance of serving nodes 112*a*, 112*b*, . . . , 112*g* belonging to capture pool 180.

In the present embodiment, master 112*i* adjusts the selection of nodes in capture pool 180 dynamically based on node utilization and the ratio of captured data packets 102B to routed data packets 102A passing through router 106D (see FIG. 1) as reported by capture ratio monitor 176. Again, the selection is actually implemented by distributed protocol 132 and its subordinate portions 132'. Whenever capture performance as indicated by the capture ratio of captured to routed packets drops below the desired 100% capture ratio, master 112*i* increases the size of capture pool 180 with the aid of management protocol 132, 132'. The increase in the number of nodes in capture pool 180 continues until the ratio is again steady at 100%. Thus, the capture ratio is deployed as a parameter based on which master 112*i* increases and decreases the number of specially provisioned serving nodes in capture pool 180 to achieve the desired dynamic adjustment.

After captured data packets 102B are written to high-access-rate media of serving nodes belonging to capture pool 180, both popular packets 102B1 and unpopular packets 102B2 are written to low-access-rate storage media. However, after the writing step popular packets 102B1 are treated differently from unpopular packets 102B2. Specifically, popular packets 102B1 are retaining in high-access-rate non-transitory storage media while unpopular packets 102B2 are not. Unpopular packets 102B2 are demoted instead.

Figure 4:
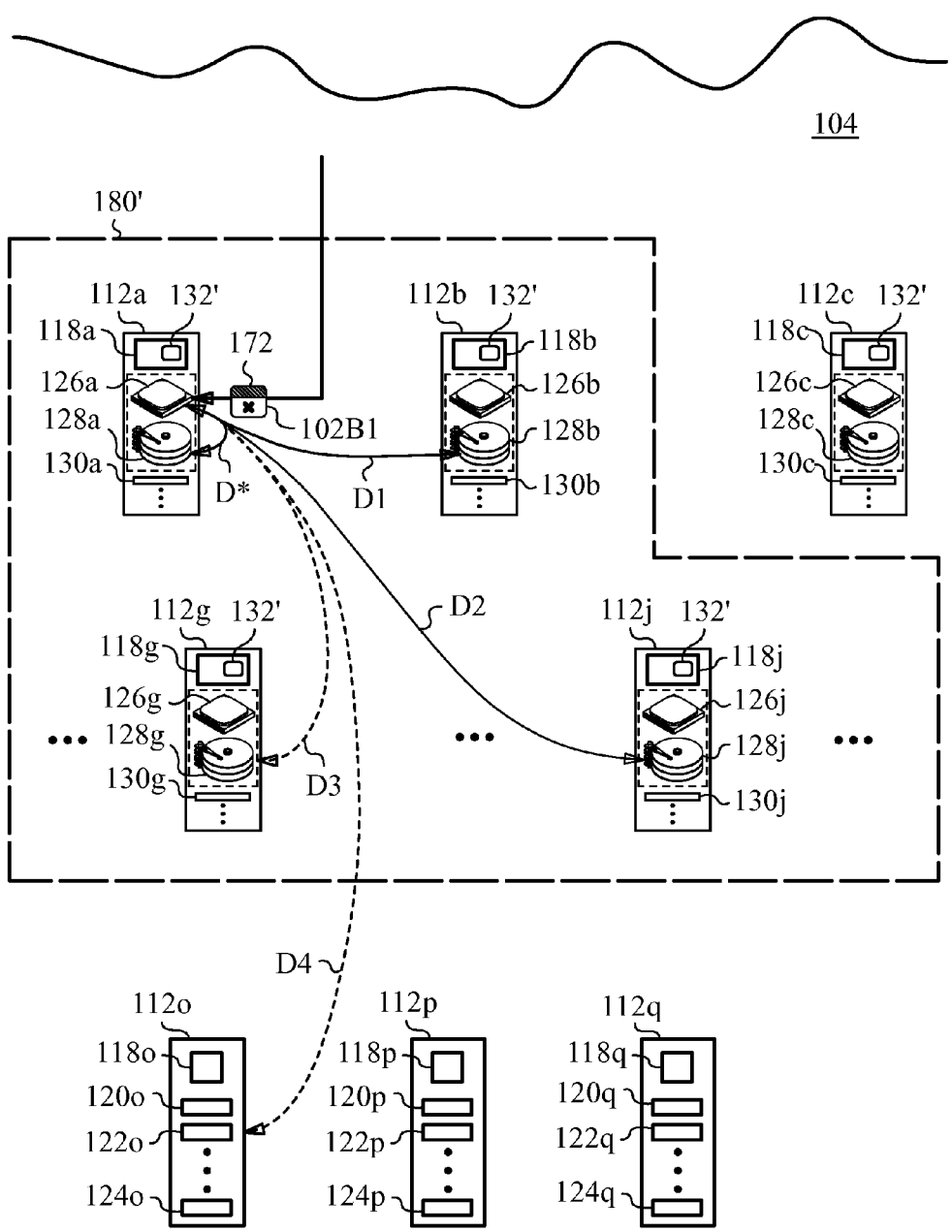
FIG. 4 is a diagram illustrating the process of writing popular captured data packets from high-access-rate non-transitory storage media to low-access-rate non-transitory storage media of at least two serving nodes of the high availability cluster of FIG. 1.

FIG. 4 is a diagram illustrating the process of writing popular captured data packets 102B1 from high-access-rate non-transitory storage media 126a of serving node 112a to low-access-rate non-transitory storage media of at least two other serving nodes belonging to high availability cluster 104. In FIG. 4, original capture pool 180 has been expanded to larger capture pool 180'. Pool 180' includes nodes 112a, 112b, . . . , 112g, . . . , 112j and several other nodes that are not specifically indicated. Node 112c is the back-up master candidate, as previously mentioned, and it is therefore excluded from pool 180'. Also shown are nodes 112o, 112p, 112q that lack the proper provisioning to be members of pool 180', but can nevertheless be useful as serving nodes of cluster 104.

In accordance with the invention, after being captured and written to any available high-access-rate media 126a, 126b, . . . , 126g, . . . , 126j belonging to nodes 112a, 112b, . . . , 112g, . . . , 112j of pool 180', all captured data packets 102B are written to low-access-rate storage media. In the case of popular packet 102B1 initially stored in high-access-rate media 126a of node 112a, it is written to low-access-rate media 128b of node 112b and to low-access-rate media 128j of node 112j. The two write operations are monitored by distributed management protocol 132, 132' and the two writes are indicated by solid arrows D1, D2. These operations satisfy the requirement that at least two low-access-rate media of at least two serving nodes of cluster 104 receive copies of packet 102B1. After the writes are completed, popular packet 102B1 is retained in high-access-rate media 126a of node 112a to which packet 102B1 was originally written and thus remains highly available in high-access-rate media 126a before and after devolution of its two copies.

Of course, protocol 132, 132' can indicate that packet 102B1 be written to two other serving nodes. FIG. 4 illustrates two such alternative writes by dashed arrows D3, D4. As shown by arrow D3, one copy of popular packet 102B1 is thus written to low-access-rate media 128g of node 112g that belongs to pool 180'. Arrow D4 shows that the second copy of popular packet 102B1 is written to some unspecified low-access-rate media of serving node 112o. Node 112o is not a member of pool 180', but it is capable of serving packet 102B1 if necessary (e.g., upon failure of other serving nodes). It should be noted that the exact choice of serving nodes to which copies of packet 102B1 are written is based on well-understood performance parameters of cluster 104 as well as proper balancing and optimization. Both of the latter will be addressed below. Furthermore, for reasons of high availability and immunity to node failure (failover events), however, it is important that data packet 102B1 be written to at least two different low-access-rate media not including back-up master candidate 112c.

It should also be noted that packet 102B1 can be temporarily written locally to low-access-rate storage media 128a. This operation is indicated by arrow D*. While such write operation is permissible and useful in some cases, e.g., when trying to unburden high-access-rate storage media 126a before writing to other nodes, it does not qualify as a devolution operation in accordance with the invention. In other words, the devolution has to be to low-access-rate media of at least two nodes other than the node to which packet 102B1 was originally striped.

Figure 5:
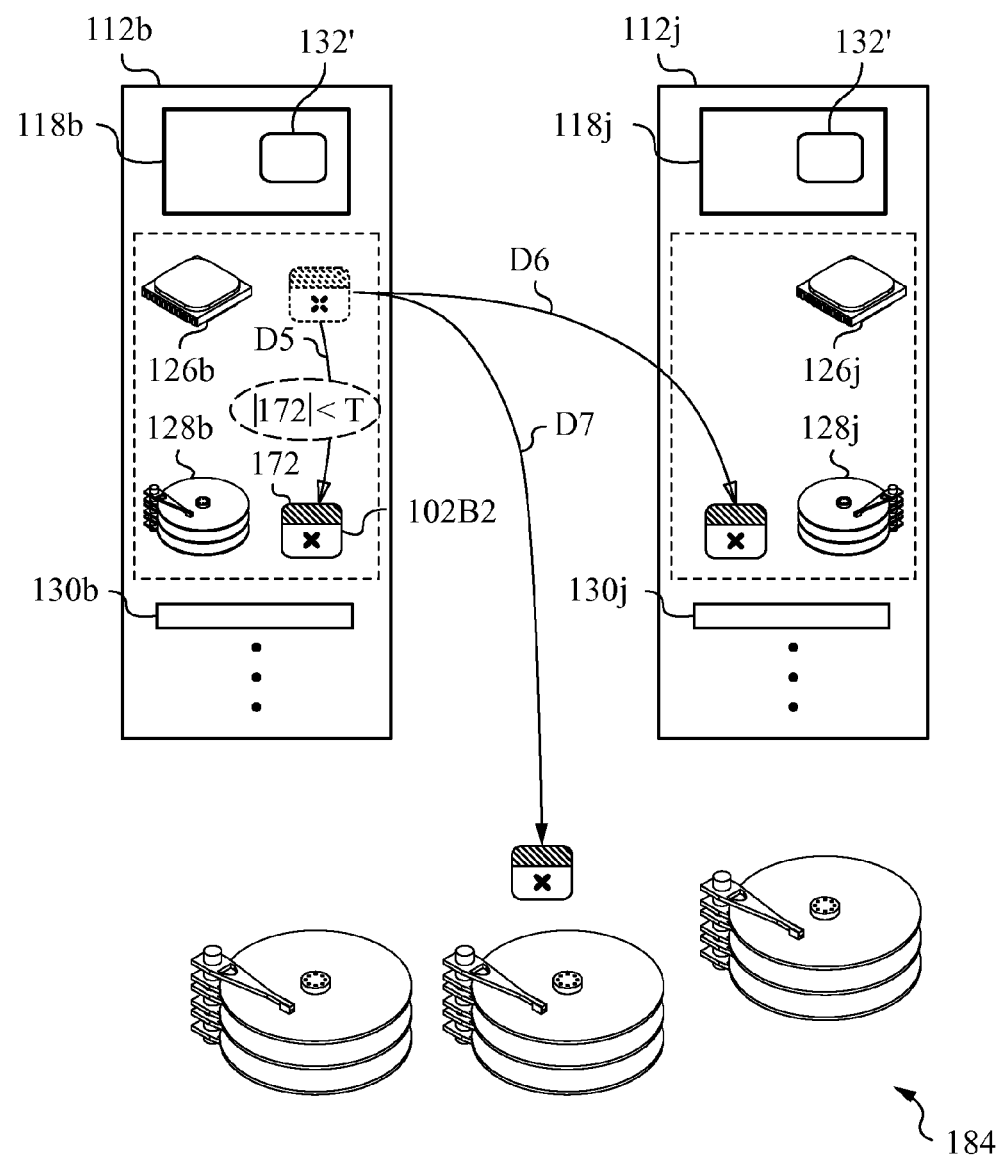
FIG. 5 is a diagram showing the devolution of low popularity captured data packets to low-access-rate storage media in accordance with the invention.

As already remarked, the process of devolution or being written to low-access-rate media of at least two serving nodes is deployed for all packets 102B, including unpopular ones such as packets 102B2. FIG. 5 is a diagram that illustrates the devolution of low popularity packet 102B2 whose tag value is below threshold T. At the time shown, captured data packet 102B2 already resides in high-access-rate storage medium 126b of node 112b. That is because packet 102B2 was previously written to high-access-rate medium 126b of node 112b during the striping step.

To ensure rapid demotion of low-popularity packet 102B2, the operation is again preferably implemented by subordinate portion 132' of distributed management protocol 132. Management protocol portion 132' runs locally on machine 118b of node 112b and is hence in best position to execute the demotion task. Meanwhile, in the preferred embodiment, the portion of management protocol 132 running on master node 112i monitors overall capture performance and may, as required, adjust the value of popularity threshold T. In fact, management protocol 132 can even change the formula for computing the value of tag 172 in agreement with any of the above-described methods or still other suitable mathematical techniques.

Now, protocol 132 marks the block in high-access rate medium 126b where low popularity captured data packet 102B2 resides as available for overwriting right after packet 102B is written to at least two different low-access-rate media of two nodes. Such devolution without retention is what is meant by demotion herein.

As in the case of popular data packet 102B1, several options exist for how and to what low-access-rate medium to write packet 102B2. One possible devolution of packet 102B2 is indicated by arrow D5. Arrow D5 illustrates the writing of packet 102B2 whose tag value |172| is less than threshold T (|172|<T) from high-access-rate media 126b to low-access-rate media 128b on same node 112b. In other words, both media 126b, 128b are local and thus the devolution is local. Furthermore, only the resources of serving node 112b are involved in this operation. Of course, as already remarked above, it is not sufficient for high availability to devolve only locally. However, because packet 102B1 is not popular, this may be practiced in some embodiments.

Arrow D6 illustrates the writing a copy of packet 102B2 from high-access-rate media 126b to low-access-rate media 128j. Media 128j does not belong to serving node 112b. Rather, low-access-rate media 128j belongs to node 112j of cluster 104. Node 112j is a serving node that belongs to capture pool 180' (see FIG. 4). Alternatively, node 112j may be one of the nodes of cluster 104 that is not eligible for capture pool 180' and/or is not a candidate for master or back-up master, but yet is capable of receiving and storing captured data packet 102B2 from node 112b.

Another copy of packet 102B2 is written to still other low-access-rate storage media 184 indicated by arrow D7 belonging to still another node (not shown). Here, low-access-rate media 184 are embodied here by an array of hard disk drives, e.g., a RAID. It is noted that media 184 can be designated as lower tier storage when captured data packet 102B2 being demoted is of such low popularity that it is unlikely to be queried by any client or user of high availability cluster 104.

Preferably, packet 102B2 is devolved locally between high-access-rate and low-access-rate media 126*b* and 128*b* as indicated by arrow D5 when value |172| of its tag 172 is not significantly lower than threshold T. That is because packets that fall just under popularity threshold T may become popular after demotion and require re-promotion in the near future to high-access-rate media to ensure their high availability.

On the other hand, when value |172| of tag 172 is significantly below threshold T, packet 102B2 can be devolved to low-access-rate media of two nodes that may not even be members of pool 180'. Re-promotion or migration of data packet 102B2 thus devolved can still be performed rather efficiently, albeit not as quickly as in the case of local demotion between local media 126*b* and 128*b*.

Finally, when tag value |172| of captured data packet 102B is significantly less than popularity threshold T and unlikely to increase in the future, then packet 102B2 is demoted to RAID 184. Indeed, packet 102B2 could even be stored in archival storage in situations where it is only of archival value. Since, according to the invention, all captured data packets 102B are initially placed in high-access-rate media, all of them are highly available prior to demotion of unpopular data packets.

Meanwhile, after being devolved, captured data packet 102B2, whose popularity tag 172 fell below threshold T, is allowed to be overwritten in high-access-rate storage medium 126*b* by newly captured data packets 102B or by other data. This completes the demotion and is indicated in FIG. 5 by packet 102B2 next to medium 126*b* being drawn in dashed lines.

In the above example, the popularity or the value of tag 172 was computed from four popularity metrics 178 selected by protocol 132, 132'. It will be understood by those skilled in the art that the value of tag 172 can be derived from any combination of admissible popularity metrics 178 including those innate to capture data packets 102B and those derived during their capture, such as capture time. It is also noted that search rank is a very useful popularity metric for the computation. Thus, for example, one can also derive popularity from combining capture time value in a first bin, with ingest interface ranking assignment in a second bin and numeric search rank in a third bin. The three bins may thus contain values such as: YMD_HMS_NS, A1, +5. The first bin is capture time expressed in GMT. The second bin is ingest interface identified by its relative importance designation, here simply a numeric value. The third bin is search rank expressed with a signed numerical value. The popularity value is here computed by a sum, as expressed by Eq. 1 above.

As previously stated, irrespective of the popularity metrics chosen, all captured data packets 102B, including popular ones are written to at least two low-access-rate storage media. This is done to ensure redundancy and hence availability of data packets in the event of serving node failures. The difference is that a very unpopular captured data packet 102B2, can be devolved locally as indicated by arrow D5, as well as non-locally as indicated by arrow D6 and even out of pool 180' as indicated by arrow D7 to lower tier storage, while popular data packet 102B1 should have two copies in low-access-rate media of serving nodes of cluster 104 only.

As traffic is ingested from multiple sources some captured data packets 102B may be immediately demoted to second or even third tier storage based on the popularity of their tags 172. Note that tags 172 could include information such as TCP port of traffic and type of data, e.g., e-mail. The type of data could dictate its popularity and subsequent grouping. Thus, it could be beneficial to demote all captured e-mail to the same storage location. Meanwhile, all captured web traffic can be put in another location. This approach could go as far as even placing encrypted data into nodes with suitable processor types for decrypting and/or other environment in which they are kept for later decryption.

Figure 6:
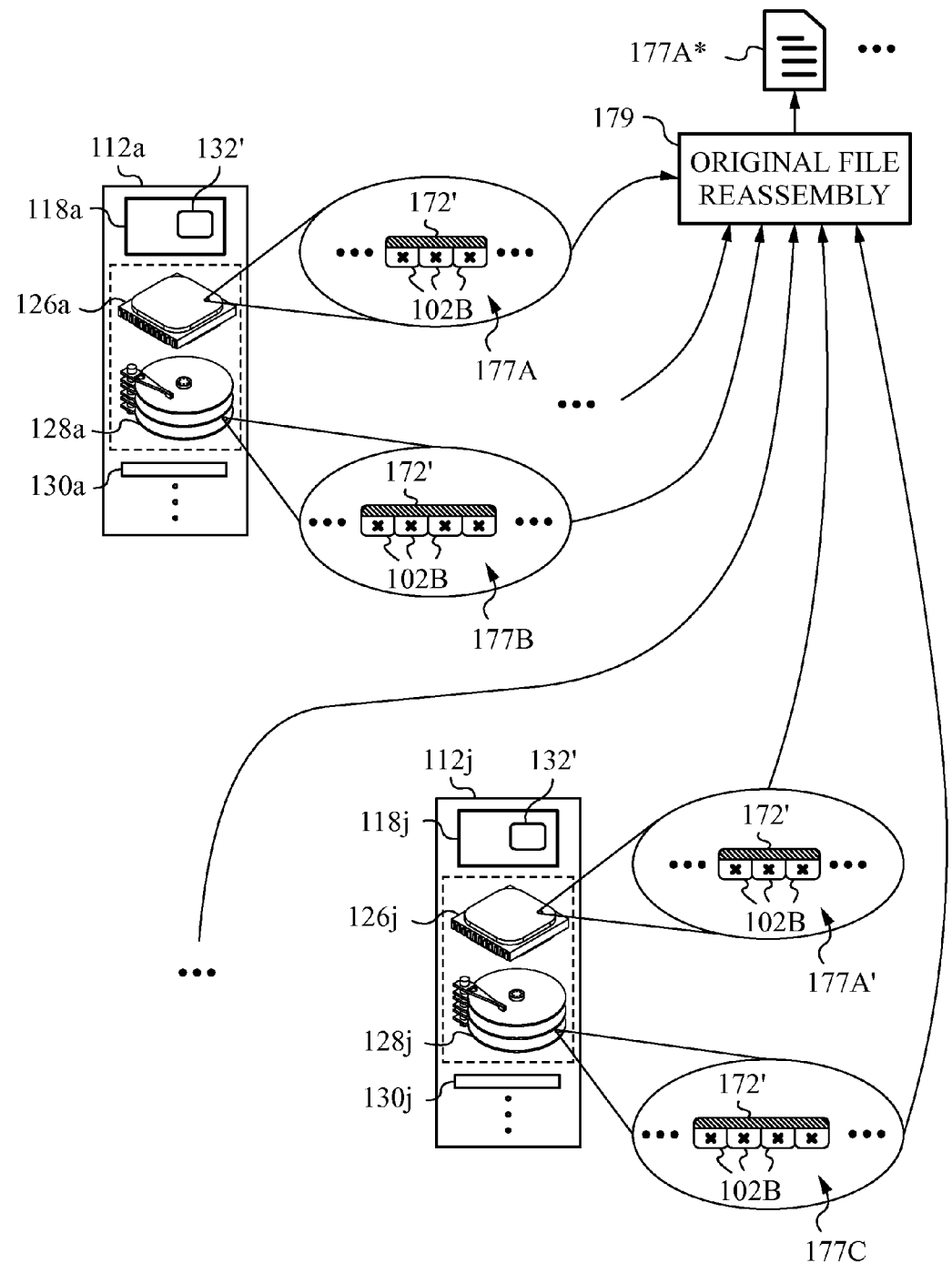
FIG. 6 is a diagram illustrating reassembly of captured data packets into original files.

Until now the teachings have addressed the capture, popularity tag assignment, popularity calculation, devolution and demotion of captured data packets 102B. However, the same operations can just as easily be performed on groups of captured data packets 102B. FIG. 6 is a diagram that illustrates this schematically based on a number of captured packets 102B stored in various serving nodes of cluster 104. For reasons of clarity, only two serving nodes, namely nodes 112*a* and 112*j* are shown in this drawing. Also for reasons of clarity, only the content of a few blocks in high-access-rate storage media 126*a*, 126*j* and in low-access-rate storage media 128*a*, 128*j* are shown explicitly in the enlarged insets of FIG. 6. The ellipsis and additional arrows indicate that the same process will apply to all serving nodes and their storage resources.

Turning first to high-access-rate storage media 126*a* of node 112*a*, we note a storage block that contains a set of three captured data packets 102B that are combined into a single captured file 177A. The three captured packets 102B combined into captured file 177A all come from the same stream of data captured via router 106D from external network 100 (see FIG. 1). In other words, captured file 177A contains the set of packets 102B that are known to come from the same original file. The fact that this is so is ascertained by checking standard data contained in packets 102B in a manner well understood by a skilled artisan.

Review of requisite packet information to perform the appropriate grouping of packets 102B into captured files is preferably done at the time of capture. As seen by turning back to FIG. 1, this is done by capturing device 108, which groups packets 102B into corresponding captured files prior to striping them. Unlike in the previous embodiments, however, device 108 is instructed by protocol 132, 132' to attach a captured file popularity tag to the captured files rather than individual data packets 102B. Consequently, comparison with threshold T is performed for entire captured files rather than their constituent packets 102B.

Returning now to FIG. 6, we see that a specific captured file 177A is indeed provided with a single captured file popularity tag 172'. In this case, tag 172' of captured file 177A has a value exceeding threshold T and captured file 177A is thus retained in the storage block(s) of high-access-rate storage media 126*a*. Meanwhile, a captured file 177B whose tag 172' has a value below threshold T is maintained in storage block(s) of low-access-rate storage media 128*a*. Similarly, low popularity captured file 177C is maintained in low-access-rate storage media 128*j* of node 112*j*.

We also see that a second portion of captured file 177A' is maintained in high-access-rate storage media 126*j* of node 112*j*. Such fragmentation of captured files is permissible during striping. A person skilled in the art will realize that since the master node retains information about the striping process in accordance with well-known procedures, fragmentation of captured files across storage resources is not a problem.

In accordance with the invention, the steps of striping, writing and retaining of captured data files 177 are applied based on captured file popularity tags 172' in the same manner as in the case of data packets 102B and their tags 172. In fact, captured file popularity tags 172' are preferably composed of the same popularity metrics as already described. These include capture time, any popularity attribute assigned by a search ranking algorithm such as Lucene, or indeed any metrics from the group including interface, source, destination, protocol, port, packet length, time-to-live and version.

An additional advantage of combining captured packets 102B into captured files 177 is the ability to more easily reconstitute or reassemble the original files. FIG. 6 illustrates an original file reassembly module 179, which can be implemented by protocol 132, 132' or by any other suitable program such as Map-Reduce. As captured packets or captured files are reassembled, the MapReduce process would "find" whatever criteria the user had defined. This could be looking for PDFs, movies, MP3s, Excel files, etc. from captured packets and/or captured files.

In the present embodiment, upon a request to reassemble a particular original file 177A*, local protocol 132' running on all serving nodes including nodes 112a, 112j report whether and where locally available fragments of original file 177A* are located. In the present case, fragments of original file 177A* correspond to two captured files 177A and 177A'.

To reassemble original file 177A*, module 179 first requests that copies of captured files 177A, 177A' be delivered to it from storage media 126a, 126j. Once that is done, module stitches files 177A, 177A' together and delivers to for retrieval or examination purposes or any other request of any user of administrator.

Figure 7:
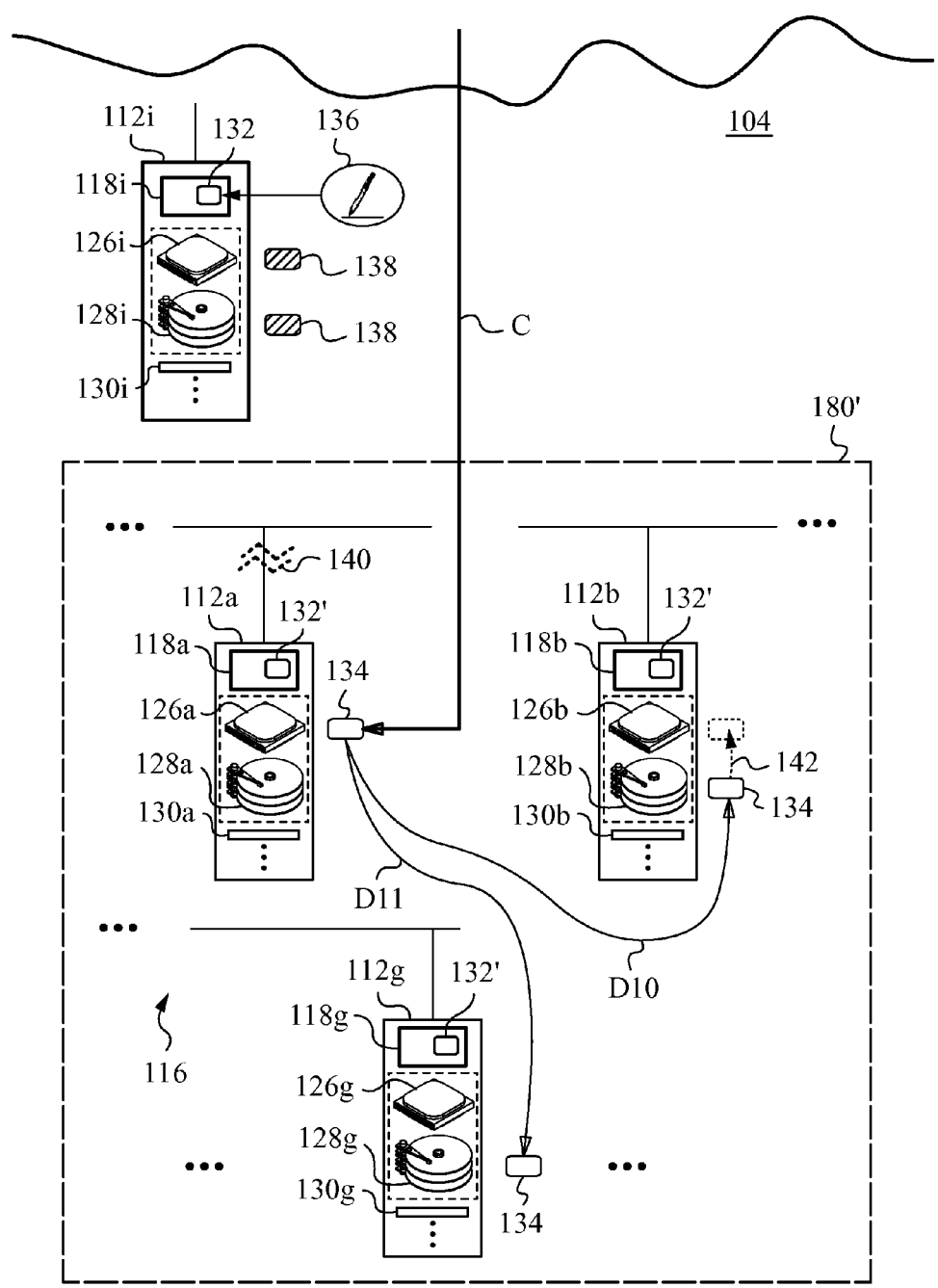
FIG. 7 is a diagram illustrating operation upon failure of a node as well as migration or re-promotion of captured data packets or captured files.

We now refer to FIG. 7 to examine the advantage of devolving and demoting captured packets or captured files in accordance with the invention. In order to simplify the explanation, FIG. 7 introduces a high availability file 134, which embodies either a popular captured packet 102B1, a popular captured file 177 or even captured portions 177A or 177A' of the high popularity file as described above. FIG. 7 shows master node 112i as well as serving nodes 112a, 112b and 112g of cluster 104. All serving nodes 112a, 112b, 112g are members of expanded capture pool 180' managed by distributed management protocol 132, 132'.

First, a new high availability file 134 is captured into cluster 104 as described above and striped to high-access-rate storage media 126a of serving node 112a of pool 180', as indicated by arrow C. It should be noted here, that master 112i can employ protocol 132 running on its machine 118i to change serving node selection of high availability file 134. In the present case, serving node 112a, which is also the node to which file 134 was originally written upon capture, is to remain the serving node of file 134. In addition, master 112i writes metadata 138 related to file 134 to its high-access-rate storage medium 126i and to its low-access-rate storage medium 128i. Metadata 138 includes typical information about file 134 and the chosen serving node 112a.

Next, file 134 is devolved or written to low-access-rate storage media 128b, 128g of nodes 112b, 112g but not to master node 112i or serving node 112a. In other words, copies of file 134 are written as indicated by arrows D10, D11 to low-access-rate storage media 128b, 128g of each of the k-2 nodes, excluding master node 112i and serving node 112a. Note that any back-up master node should also be excluded for reasons discussed above.

When receiving normal requests, such as a write request 136 for access to file 134 by a user, master 112i automatically routes the requests to file 134 stored in high-access-rate storage medium 126a of serving node 112a. In particular, the routing is indicated by protocol 132. Correspondingly, metadata 138 kept by master 112i indicates the path to file 134 stored in high-access-rate storage medium 126a of node 112a. Because of the performance gap between the high and low-access-rate storage media discussed earlier, this routing ensures that file 134 is highly available to clients during normal operation.

While cluster 104 operates normally, master 112i receives the typical status information and updates from all nodes 112a-q of cluster 104 via LAN 116. A "heartbeat" as well as other signaling conventions and cluster management protocols are deployed for this purpose. These mechanisms are well known in the art of operating computer clusters.

With the aid of the above-mentioned mechanisms, master 112i is able to provide input to management protocol 132 running on master machine 118i from its subordinate portions 132' running on the other nodes belonging to pool 180'. Thus, protocol 132 is able to monitor the availability of file 134 on high-access-rate storage medium 126a of serving node 112a.

Upon disruption in availability of file 134 on serving node 112a, protocol 132 is alerted. The disruption may be due to any typical cause, such as loss of connection, instability, failure of machine 118a, or other event that renders it useless or unreliable. In the situation illustrated in FIG. 7, the failure is due to lost connection with LAN 116, as indicated by communication line break 140.

Protocol 132, upon disruption of availability, issues an order directed at back-up node 112b to migrate file 134 from its low-access-rate storage medium 128b to its high-access-rate storage medium 126b. The execution of this order is indicated by dashed arrow 142. Thus, protocol 132 migrates file 134 when serving node 112c fails in order to ensure that file 134 remains highly available to the users of cluster 104.

In addition to ensuring high availability, the invention also provides for migrating files from low-access-rate media to high-access-rate media for other reasons than node failure. Referring again to FIG. 7 the migration indicated by arrow 142 can be performed as part of re-promotion of any captured packet or captured file whose tag 172 dropped below threshold T but then increased above threshold T. Such migration, also termed re-promotion, is preferably handled by protocol 132, 132'. This type of re-promotion can be caused by an increased popularity of a demoted captured packet or captured file.

Re-promotion can also be precipitated by a change in either popularity metrics 178 used to compute the value of tags 172, 172' and/or the numeric value of threshold T (see FIG. 2B). For example, the selection of metrics 178 and/or threshold T can be changed by a user or administrator during operation of cluster 104. Such change is recorded by protocol 132, 132' and causes a re-computation of popularities and initiate migration. Captured packets 102B and/or captured files 177 that were previously determined to have low popularity but according to the new computation exhibit popularity above threshold T, are now re-promoted to high-access-rate storage media to ensure their high availability.

In addition to supporting the above functionality, protocol 132 has additional advantageous features. Notably, protocol 132 provides cluster 104 with re-balancing capabilities.

Figure 8A:
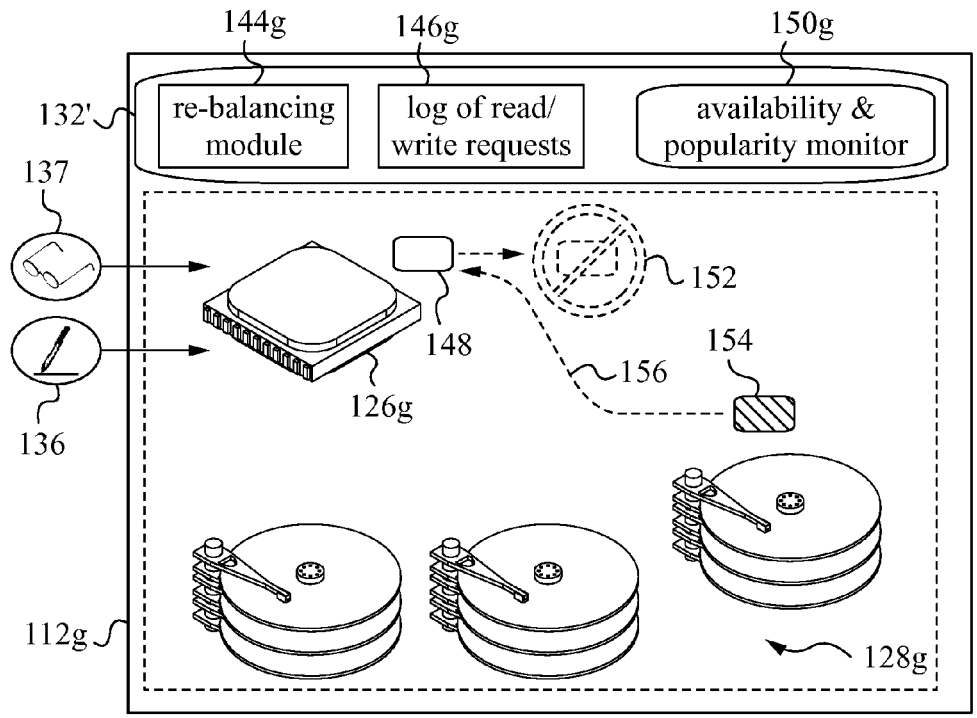
FIG. 8A is a diagram that illustrates an exemplary type of re-balancing of storage resources.

A first example of re-balancing is illustrated with the diagram in FIG. 8A. This drawing depicts a node 112g running subordinate portion of protocol 132', which includes a re-balancing module 144g. Subordinate portion of protocol 132' also has a log module 146g that tracks the number of write requests 136 and read requests 137 to a high availability file 148 that it is serving from its high-access-rate storage medium 126g. An availability and popularity monitor 150g is also included in subordinate protocol 132'. It should also be noted that low-access-rate storage medium 128g of node 112g includes three separate hard drives rather than just one. In fact, a person skilled in the art will recognize that many nodes 112 of cluster 104 may be provisioned with multiple drives or drive arrays.

Re-balancing module 144g monitors either directly based on the number of client read/write requests 136, 137 recorded by log 146g, or based on other popularity metrics gathered by monitor 150g, how popular file 148 is among the users based on popularity metrics and computations taught above.

When the popularity of file 148 drops below threshold T, subordinate portion of protocol 132' reports that fact to managing portion of protocol 132 residing on master 112i. Furthermore, protocol 132' removes file 148 from its high-access-rate storage medium 126g to free up storage space. The removal is indicated by icon 152. Of course, file 148 will typically remain stored in low-access-rate storage medium 128g and still be served to users on request. Also, master 112i informed of the demotion of file 148 will correspondingly update its metadata about file 148. In particular, the path will be updated such that future read/write requests are directed to file 148 on low-access-rate storage medium 128g (or low-access-rate storage medium on another one of the other nodes where file 148 is also present).

Now, master 112i is fully cognizant of the fact that valuable storage space on high-access-rate storage medium 126g is freed-up. It can now act in one of two ways. In a first case, master 112i devolves the responsibility back to subordinate portion of protocol 132' on re-balancing module 144g. Machine 112g is thus left to determine locally which, if any, of the files that presently reside on its low-access-rate storage medium 128g has exceeded the set popularity threshold T.

In the present case file 154 qualifies under this criterion. Thus, re-balancing module 144g of protocol 132' issues the order that file 154 be migrated to high-access-rate storage medium 126g as indicated by dashed arrow 156 to take advantage of the freed-up space and ensure high availability of file 154. Protocol 132' informs protocol 132 of master 112i of re-balancing module's 144g choice of file 154. Thus alerted, master 112i can correspondingly update any metadata, including the new path to file 154 for future in-coming read/write requests from users.

In the preferred embodiment, however, master 112i itself controls the re-balancing operation in a cluster-wide manner with its own re-balancing module (not shown) included in protocol 132'.

Armed with these provisions, actions to re-balance cluster 104 can be undertaken based on the results of monitoring the availability and popularity of many files on all serving nodes. The outcome may be the same, with file 154 being promoted to high-access-rate storage medium 126g. Alternatively, a file from another node 112a-c belonging to the serving nodes can be instructed to migrate its file to high-access-rate storage medium 126g of node 112g.

The policy should ensure that minimum replication thresholds are met (i.e., that sufficient low-access-rate storage medium copies exist to ensure durability even if one or more replicas fail concurrently). The policy may also ensure adequate cluster-wide load balancing by splitting or migrating frequently accessed regions. This can be accomplished by comparing the relative read/write access ratios of the cluster machines. If one machine is serving significantly more data than the average, it may be a candidate for hot data migration. If per-machine least frequently used (LFU) or ARC policies are used, approximate or precise frequency information can be used to select individual blocks as migration candidates.

Another aspect of the invention has to do with re-balancing based on storage capacity of high-access-rate storage medium 126. Clearly, due to cost, the capacity of high-access-rate storage medium 126 cannot be very large in order to contain the cost of provisioning cluster 104. Thus, it is not just the popularity of a given file that needs to be accounted for in re-balancing, but also just the capacity of high-access-rate storage medium 126.

Figure 8B:
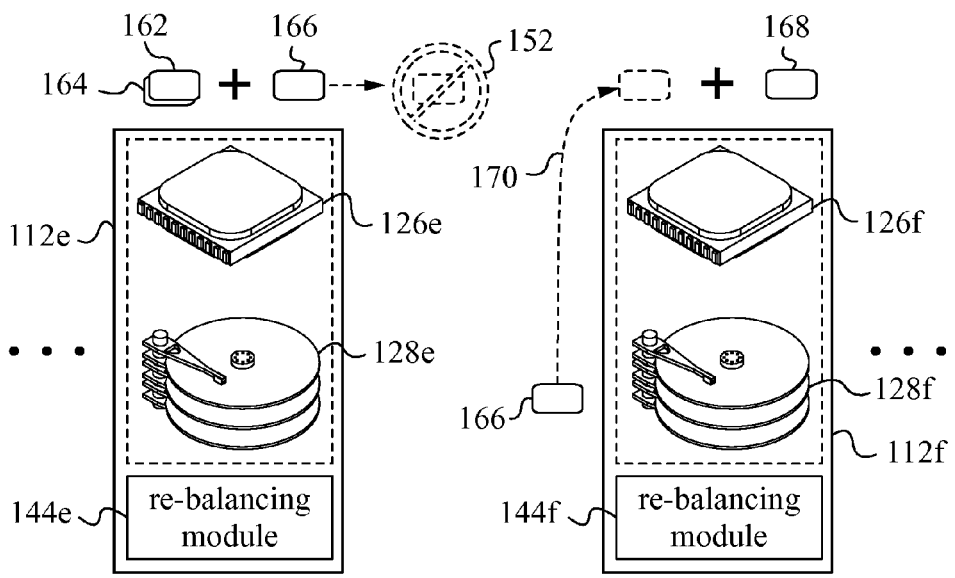
FIG. 8B is a diagram showing another type of re-balancing of storage resources.

To better understand this, we now turn to the diagram of FIG. 8B. This figure shows how to apply re-balancing of high availability files 162, 164 and 166 based on storage capacity. Files 162, 164 and 166 are served from high-access-rate storage medium 126e of a serving node 112e belonging to the serving nodes of cluster 104. The selection of node 112e as serving node for files 162, 164 and 166 was made by master 112i in the course of running distributed management protocol 132, 132' in the manner explained above, for example due to file or block falling below the minimum number of replicas, or migrating due to cluster-wide load balancing.

FIG. 8B shows re-balancing module 144e running as part of subordinate portion of protocol 132' on the machine of serving node 112e. Re-balancing module 144e monitors the size of all files 162, 164 and 166 that are being served because of their high popularity. The actual methods for monitoring the available memory in medium 126e such as a flash drive is a well known and will not be discussed herein.

As a result of read/write operations, files 162, 164, 166 end up taking more storage space, threatening to breach the capacity of high-access-rate storage medium 126e. Such situations can lead to overflow and data loss. Hence, protocol 132' lets re-balancing module 144e report to protocol 132 on master 112i that medium 126e is in danger of overflowing.

Protocol 132 locates another one of the k-1 nodes, in this case node 112f, whose high-access-rate storage medium 126f has considerable excess storage capacity. In fact, node 112f acts as serving node of only one small high availability file 168 as node 112e is close to overflow. Protocol 132 now instructs re-balancing module 144e to remove file 166 from its high-access-rate storage medium 126e.

Contemporaneously, protocol 132 instructs re-balancing module 144f to have node 112f become the serving node of file 166. Thus, re-balancing module 144f oversees the migration of file 166 from its low-access-rate storage medium 128f to its high-access-rate storage medium 126f. This migration is indicated by dashed arrow 170. Once the migration is performed, metadata including the path to file 166 now ready to be served from medium 128f of serving node 112f is updated to master 112i. This re-balancing operation based on storage capacity ensures continuous high availability of file 166 to users. In general, it is preferable that re-balancing operations based on storage capacity be continuously performed on a cluster-wide basis.

It should be noted that in practice it is advantageous that management protocol 132 and subordinate portions of protocol 132' running on the machines of the serving nodes not communicate too often. In particular, their communications preferably take advantage of LAN 116 and are carried out asynchronously. It is preferable that only a few percent, and at most 10-20% of the bandwidth of LAN 116 be used for asynchronous communications by protocol 132, 132'.

The above-discussed re-balancing between the high-access-rate storage medium and the low-access-rate storage medium of at least one of the nodes is preferably practiced on the entire distribution of highly available files. In other words, all serving nodes are subject to re-balancing on an on-going basis. Additional teachings on re-balancing and cluster-wide parameters the reader is referred to U.S. patent application Ser. No. 13/373,142 by Michael W. Dalton.

In some embodiments, captured data packets or captured files will be operated on or used in certain types of computations that are best suited or even only executable in specific file systems. It is thus advantageous to capture packets and files into a high availability cluster that is adapted to support two or more types of distributed file systems.

Figure 9:
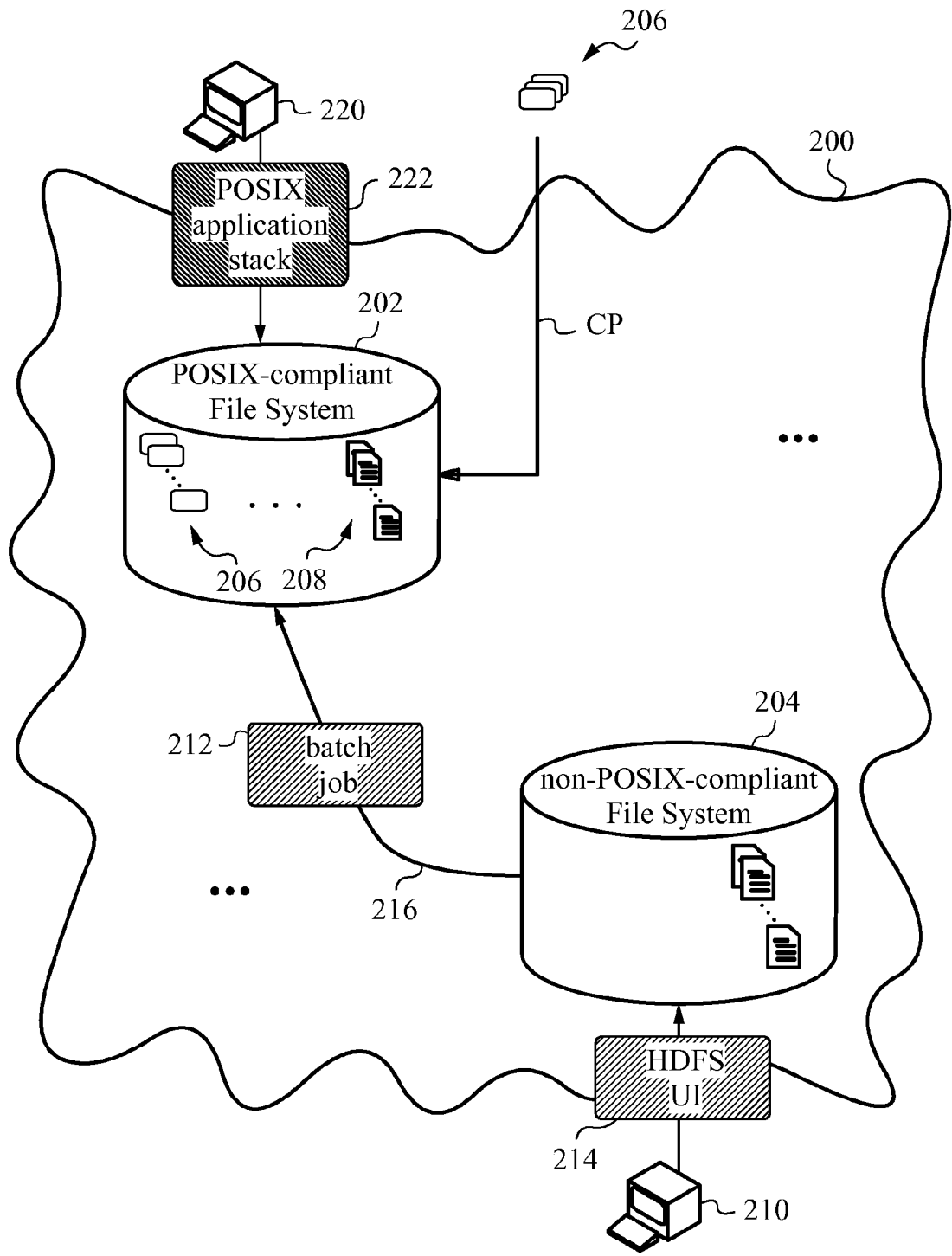
FIG. 9 is a diagram showing an advantageous approach to the capture of data packets and files into high availability cluster that supports POSIX-compliant and non-POSIX-compliant file systems.

FIG. 9 illustrates a high availability cluster 200 partitioned to support a POSIX-compliant File System 202 (PCFS). Preferably, PCFS 202 is a UNIX Distributed File System and more preferably still the Lustre Distributed File System with encrypted ZFS storage. ZFS is the Zettabyte File System developed by Sun Microsystems and is advantageous because it is a logical volume manager that is very resistant to data corruption and is appropriate for large clusters as it uses check-sums to supervise system-wide data integrity.

The other system supported by cluster 200 is a non-POSIX-compliant File System 204 (NPCFS), such as the Hadoop Distributed File System (HDFS) or else file systems such as ZFS or MogileFS. The individual nodes of cluster 200 are not shown. However, it will be understood by those skilled in the art that the resources of the various nodes of cluster 200 have to be properly formatted to support such partitioning using the default tools provided by HDFS and other NPCFS. In the case of HDFS, the file system volumes can be structured in a manner using the default HDFS tools and standard POSIX controls, that allows for simple and easy indexing of the data based on the popularity metric. A simple case could be implemented by creating a directory structure that mimics the indexing that is acceptable for the data being captured.

Captured data 206 is brought into cluster 200 in the manner already described above. Note that in the present case, data 206 represents captured data packets and/or captured data files. Advantageously, captured data 206 are initially striped over nodes that run PCFS 202 as indicated by arrow CP. That is because the standards of such file systems, and especially of Lustre Distributed File System, are well-suited for rapid writing, devolution, demotion and migration of data. Furthermore, any original files 208 that are reassembled from captured data 206, as described above or in any other suitable manner, are also shown in PCFS 202. In general, of course, there will be still many other files that are not specifically indicated in FIG. 9 that are stored in PCFS 202. These other files are also available to users of cluster 200.

Upon introduction into PCFS 202, it is advantageous to assign captured data 206 to certain block locations in PCFS 202. In this manner, other data files that were not obtained, devolved, demoted and migrated (e.g., re-promoted) by popularity in accordance with the invention are kept separate but also accessible to users of cluster 200.

Now, a specific user 210 of cluster 200 desires to perform computations or operations that are supported by NPCFS 204 but not PCFS 202. For example, user 210 wishes to perform a user-defined operation 212 such as a batch job on captured data 206, reassembled original files 208 as well as any other files managed in the partition that is managed under PCFS 202. Such batch jobs 212 usually include Map-Reduce, which is one of the most popular batch jobs supported within HDFS 204, but not within PCFS 202.

Thus, user 210 logging into HDFS 204 via an HDFS user interface 214 (HDFS UI) requires a connection 216 from HDFS 204 to PCFS 202 such that batch job 212 can be performed on captured data 206 and any other data within PCFS 202. Furthermore, in many embodiments it is convenient to also establish an access window to the captured data packets in the POSIX-compliant UNIX file system. This is particularly helpful for monitoring the performance of a typical batch job being performed on the data. Advantageously, the access window is embodied by a POSIX-compliant interface to the POSIX-compliant UNIX file system and it also includes a second interface to the non-POSIX-compliant Distributed File System. As the point of POSIX is to provide "a family of standards specified by the IEEE for maintaining compatibility between operating systems", any POSIX compliant operating system 220 and associated tool 222 can be used to access and monitor PCFS 202. Suitable embodiments include terminal emulation programs, graphical file browsers or specific applications or even web interfaces that are designed for the specific task of accessing and monitoring.

It will be clear to a person skilled in the art from the above description, that the capturing approaches taught admit of many alternative embodiments and can be implemented while capturing data through many routers (multiple spans) at the same time. In such cases, several capturing devices may be deployed and the capture pool may be expanded to keep pace with the high data throughput and writes to the pool. Furthermore, the captured data can be striped over various types of distributed file systems and even migrated between them. In fact, the process of expanding the number of capture nodes and expanding the storage pool should be expected and is inherently built into the design taught herein. Adding surplus capture nodes and increasing the size of the storage pool is non-destructive to existing data, as well as non-interruptive to the processes of capture, tagging and writing of captured packets (no packet loss during expansion). This includes migration strategies between different file systems or clusters where storage nodes might be geographically dispersed.

In view of the above teaching, a person skilled in the art will recognize that the invention can be embodied in many different ways in addition to those described without departing from the spirit of the invention. Therefore, the scope of the invention should be judged in view of the appended claims and their legal equivalents.

We claim:

1. A method for capturing data packets propagating in a network to a high availability cluster having a master node and serving nodes, said method comprising the steps of:
   a) establishing a wired-tap connection between said high availability cluster and at least one router belonging to said network;
   b) capturing through said wired-tap connection captured data packets from among routed data packets being routed through said at least one router;
   c) attaching a packet popularity tag to each one of said captured data packets, said packet popularity tag comprising popularity metrics related to said captured data packets, said popularity metrics including a time, an interface, a source, a destination, a protocol, a port, a packet length, a time-to-live and a version;
   d) striping said captured data packets over high-access-rate non-transitory storage media belonging to a capture pool of said serving nodes selected by said master node;

e) writing said captured data packets from said high-access-rate non-transitory storage media to low-access-rate non-transitory storage media of at least two serving nodes of said high availability cluster; and f) retaining in said high-access-rate non-transitory storage media captured data packets in which said packet popularity tag exceeds a set threshold.

2. The method of claim 1, further comprising the step of changing the selection of said serving nodes in said capture pool such that a ratio of said captured data packets to said routed data packets is substantially at 100%.

3. The method of claim 1, wherein said step of capturing said captured data packets is performed by a network packet capturing device operating at wire speed.

4. The method of claim 1, wherein at least one amongst said popularity metrics is related to a capture time.

5. The method of claim 1, wherein said popularity metrics further comprise a popularity attribute assigned by a search-ranking algorithm.

6. The method of claim 1, further comprising the steps of:
   a) combining predetermined sets of said captured data packets into captured files;
   b) attaching a captured file popularity tag to each of said captured data files;
      wherein said steps of striping, writing and retaining are applied to said captured data files based on said captured file popularity tags.

7. The method of claim 6, further comprising the step of reassembling an original file from said captured data files.

8. The method of claim 6, wherein said captured file popularity tag comprises at least one popularity metric that is related to a capture time.

9. The method of claim 8, wherein said at least one captured file popularity metric further comprises a popularity attribute assigned by a search-ranking algorithm.

10. The method of claim 1, further comprising the step of migrating from said low-access-rate non-transitory storage media to said high-access-rate non-transitory storage media captured data packets in which said popularity tag exceeds said set threshold.

11. The method of claim 10, further comprising the step of changing said set threshold thereby initiating said step of migrating.

12. The method of claim 1, further comprising re-balancing of captured data packets among said low-access-rate non-transitory storage media and said high-access-rate non-transitory storage media.

13. The method of claim 1, further comprising the step of assigning said captured data packets to predetermined block locations in a POSIX-compliant UNIX file system.

14. The method of claim 13, wherein said POSIX-compliant UNIX file system comprises Lustre.

15. The method of claim 13, further comprising the steps of:
   a) establishing a connection from a non-POSIX-compliant Distributed File System to said POSIX-compliant UNIX file system; and
   b) performing a batch job on said captured data packets within said non-POSIX-compliant Distributed File System.

16. The method of claim 15, further comprising the step of establishing an access window to said captured data packets in said POSIX-compliant UNIX file system for monitoring the performance of said batch job.

17. The method of claim 16, wherein said access window comprises a POSIX-compliant interface to said POSIX-compliant UNIX file system, and said access window is selected from the group consisting of a terminal emulation program, a graphical file browser and a web interface.

18. The method of claim 15, wherein said non-POSIX-compliant Distributed File System comprises at least one system selected from the group consisting of, Hadoop Distributed File System, MPI, Beowulf, ZFS and MogileFS.

19. A high availability cluster configured to capture data packets from a network having at least one router, said high availability cluster comprising:
   a) a master node;
   b) serving nodes each having a high-access-rate non-transitory storage media and a low-access-rate non-transitory storage media;
   c) a network packet capturing device for establishing a wired-tap connection to said at least one router to capture captured data packets from among routed data packets being routed through said at least one router;
   d) a distributed management protocol for attaching a packet popularity tag to each one of said captured data packets, said packet popularity tag comprising popularity metrics related to said captured data packets, said popularity metrics including a time, an interface, a source, a destination, a protocol, a port, a packet length, a time-to-live and a version;
   e) a capture pool selected by said master node from among said serving nodes for receiving said captured data packets, said captured data packets being striped over said high-access-rate non-transitory storage media of said capture pool and being written from said high-access-rate non-transitory storage media to said low-access-rate non-transitory storage media of at least two of said server nodes;
   whereby said distributed management protocol retains in said high-access-rate non-transitory storage media captured data packets in which said packet popularity tag exceeds a set threshold.

20. The high availability cluster of claim 19, wherein at least one of said at least two of said serving nodes to whose low-access-rate non-transitory storage media said captured data packets are written is not in said capture pool.

21. The high availability cluster of claim 19, wherein said network packet capturing device is a wire speed network packet capturing device.

22. The high availability cluster of claim 19, further comprising:
   a) POSIX-compliant UNIX file system operating on said high availability cluster;
   b) a non-POSIX-compliant Distributed File System with a connection to said POSIX-compliant UNIX file system, said non-POSIX-compliant Distributed File System being configured to perform a batch job on said captured data packets; and
   c) an access window to said POSIX-compliant UNIX file system, said access window selected from the group consisting of a terminal emulation program, a graphical file browser and a web interface.

23. The high availability cluster of claim 22, wherein said access window comprises a POSIX-compliant interface to said POSIX-compliant UNIX file system and a second interface to said non-POSIX-compliant Distributed File System.

24. The high availability cluster of claim 22, wherein said non-POSIX-compliant Distributed File System comprises at least one system selected from the group consisting of, Hadoop Distributed File System, ZFS and MogileFS.

* * * * *